US009525590B2

(12) United States Patent
Kariya

(10) Patent No.: US 9,525,590 B2
(45) Date of Patent: Dec. 20, 2016

(54) RELAY SYSTEM AND RELAY DEVICE

(71) Applicant: Hitachi Metals, Ltd., Minato-ku, Tokyo (JP)

(72) Inventor: Kazutoshi Kariya, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 190 days.

(21) Appl. No.: 14/587,084

(22) Filed: Dec. 31, 2014

(65) Prior Publication Data

US 2016/0050103 A1 Feb. 18, 2016

(30) Foreign Application Priority Data

Aug. 13, 2014 (JP) ................................ 2014-164743

(51) Int. Cl.
*H04J 1/16* (2006.01)
*H04L 12/24* (2006.01)
*H04L 12/26* (2006.01)

(52) U.S. Cl.
CPC ....... *H04L 41/0654* (2013.01); *H04L 43/0811* (2013.01); *H04L 43/10* (2013.01)

(58) Field of Classification Search
CPC .. H04L 43/0811; H04L 47/16; H04L 41/0659; H04L 41/0668
See application file for complete search history.

(56) References Cited

U.S. PATENT DOCUMENTS 6,538,987 B1 * 3/2003 Cedrone ............ H04Q 11/0478 370/216
9,379,986 B2 * 6/2016 Kariya .................... H04L 47/16
2009/0282291 A1 * 11/2009 Fitzgerald ........... H04L 43/0811 714/39
2010/0135154 A1 * 6/2010 Cheung ............... H04L 12/4625 370/223
2010/0265817 A1 * 10/2010 Kuwata ................... H04L 69/40 370/217
2010/0290345 A1 * 11/2010 Gero ................... H04L 43/0811 370/241.1
2010/0315946 A1 * 12/2010 Salam ................... H04L 12/437 370/222
2012/0008491 A1 * 1/2012 Shimada ............. H04L 12/4633 370/218
2012/0224471 A1 * 9/2012 Vinod ................. H04L 43/0811 370/222
2014/0286173 A1 * 9/2014 Bhandari .......... H04W 28/0236 370/238

(Continued)

FOREIGN PATENT DOCUMENTS

JP 2013-192034 A 9/2013
JP 2013-239909 A 11/2013

*Primary Examiner* — Melanie Jagannathan
(74) *Attorney, Agent, or Firm* — Crowell & Moring LLP

(57) ABSTRACT

Each of first and second monitoring points monitors the continuity between itself and outside of the device by use of a CCM frame. First and second internal monitoring points monitor the continuity between the first monitoring point and the second monitoring point inside the device by an internal continuity monitoring frame. When a first internal monitoring point or a second internal monitoring point does not receive the internal continuity monitoring frame within a predetermined period, a ring control unit instructs the first and second monitoring points to transmit a RDI frame or instructs them to stop transmission of a CCM frame.

10 Claims, 17 Drawing Sheets

(56) References Cited

U.S. PATENT DOCUMENTS

| | | | | |
|---|---|---|---|---|
| 2014/0293771 | A1* | 10/2014 | Sawaguchi | H04L 43/0811 370/219 |
| 2016/0013861 | A1* | 1/2016 | Ceccarelli | H04L 43/0847 398/25 |

* cited by examiner

FIG. 16

41: FAULT DETERMINATION TABLE

| | LC[1] | LC[2] | LC[3] |
|---|---|---|---|
| LC[1] | × | × | × |
| LC[2] | × | ○ | ○ |
| LC[3] | × | ○ | ○ |

○: CONTINUITY PRESENCE, ×: CONTINUITY ABSENCE

⇨ FAULT LOCATION IS LC[1]

RELAY SYSTEM AND RELAY DEVICE

CROSS-REFERENCE TO RELATED APPLICATION

The present application claims priority from Japanese Patent Application No. 2014-164743 filed on Aug. 13, 2014, the content of which is hereby incorporated by reference into this application.

TECHNICAL FIELD OF THE INVENTION

The present invention relates to a relay system and a relay device, for example, a relay system and a relay device which use a ring protocol specified by ITU-T (International Telecommunication Union Telecommunication Standardization Sector) G.8032.

BACKGROUND OF THE INVENTION

For example, Japanese Patent Application Laid-Open Publication No. 2013-192034 (Patent Document 1) discloses a technique of switching one of two RPL (Ring Protection Link) ports set to a protected state with a protected section interposed therebetween from the protected state to an open state for a predetermined period. Although failure detection of bit dependence is likely to be difficult in a CCM (Continuity Check Message) frame, this failure detection is made possible by causing a frame containing a checksum to flow for a predetermined period from one RPL port to the other RPL port.

Also, Japanese Patent Application Laid-Open Publication No. 2013-239909 (Patent Document 2) discloses a technique for enhancing fault tolerance in the case where multi-chassis link aggregation and ERP (Ethernet Ring Protection) are applied at the same time. Each of L2 switches constituting the ERP monitors a link fault between itself and a neighboring L2 switch by transmitting and receiving an ERP neighbor monitoring frame based on a CC (Continuity Check) function of Ethernet (registered trademark) OAM (Operation Administration and Maintenance) to and from the neighboring L2 switch.

SUMMARY OF THE INVENTION

For example, as one of ring protocols, the ring protocol specified by ITU-T G.8032 has been known. This ring protocol is referred to as ERP in some cases. In this ring protocol, as described in Patent Document 1 and Patent Document 2, presence or absence of fault in a link between neighboring switches is determined by transmitting and receiving a CCM frame based on a CC function of Ethernet OAM between the neighboring switches on a ring network. When the determination result is that a fault is present, path switching based on the ring protocol is performed.

However, fault does not always occur in the link between the neighboring switches, and may occur also inside a switch. In this case, each switch adjacent to the switch having a fault sometimes cannot recognize the presence of the fault. More specifically, such a situation that the CC function of Ethernet OAM operates normally though a fault which causes disconnection of the ring network has occurred in the switch having a fault may arise. Thus, the path switching based on the ring protocol is not performed, and there is a possibility of causing the frame loss and others.

The present invention has been made in view of such a circumstance, and one object thereof is to realize appropriate path switching in accordance with an internal fault of a relay device in a relay system and a relay device using, for example, the ring protocol specified by ITU-T G.8032.

The above and other objects and novel characteristics of the present invention will be apparent from the description of the present specification and the accompanying drawings.

The following is a brief description of an outline of the typical invention disclosed in the present application.

A relay system according to one embodiment is provided with a plurality of relay devices constituting a ring network. Each of the plurality of relay devices includes first and second ports and first and second monitoring points. The first and second ports are connected to the ring network. The first monitoring point monitors continuity between the first port of its own device and the second port of another device connected to the first port by use of a CCM frame based on Ethernet OAM. The second monitoring point monitors continuity between the second port of its own device and the first port of another device connected to the second port by use of the CCM frame. Here, at least one of the plurality of relay devices further includes: first and second internal monitoring points and a ring control unit. The first and second internal monitoring points are provided so as to correspond to the first and second monitoring points, respectively, and monitor continuity inside a device between the first monitoring point and the second monitoring point by transmitting and receiving an internal continuity monitoring frame at regular intervals. When the internal continuity monitoring frame is not received within a predetermined period by the first internal monitoring point or the second internal monitoring point, the ring control unit instructs the first and second monitoring points to transmit a RDI frame based on Ethernet OAM or instructs them to stop transmission of the CCM frame.

The effects obtained by typical embodiments of the invention disclosed in the present application will be briefly described below. That is, it is possible to realize appropriate path switching in accordance with an internal fault of a relay device in a relay system and a relay device using, for example, the ring protocol specified by ITU-T G.8032.

BRIEF DESCRIPTIONS OF THE DRAWINGS

FIG. 16 is an explanatory diagram illustrating an example of a method of pinpointing a fault location in the flow of FIG. 15.

DESCRIPTIONS OF THE PREFERRED EMBODIMENTS

Figure 1:
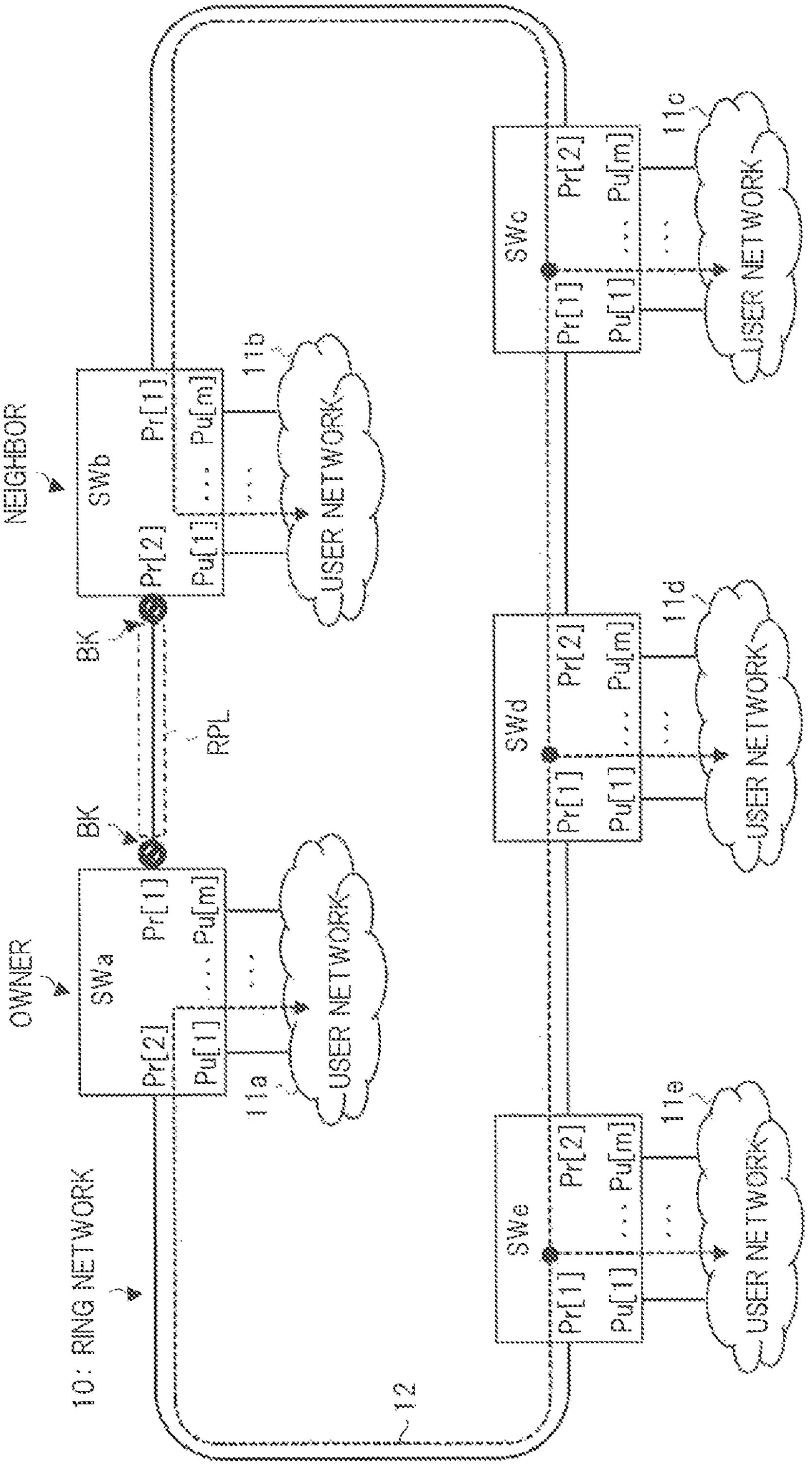
FIG. 1 is a schematic diagram illustrating a configuration example to be a premise of a relay system according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

General Configuration and General Operation of Relay System (Premise)

FIG. 1 is a schematic diagram illustrating a configuration example to be a premise of a relay system according to the first embodiment of the present invention. The relay system illustrated in FIG. 1 includes a plurality of (here, 5) switching devices SWa to SWe constituting a ring network 10. Each of the switching devices SWa to SWe has two ring ports (first and second ports) Pr[1] and Pr[2] and m (m is an integer of 1 or more) user ports Pu[1] to Pu[m]. Although the number of switching devices constituting the ring network 10 is assumed to be 5 in this example, the number is not limited to this, and may be 2 or more.

The ring network 10 is controlled based on, for example, a ring protocol specified by ITU-T G 8032. In other words, each of the switching devices SWa to SWe is provided with various control functions based on the ring protocol. Each of the switching devices SWa to SWe is a L2 switch which performs relay process of a layer 2 (L2) of an OSI reference model or may be a L3 switch which performs relay process of a layer 3 (L3). However, since the relay process on the ring network 10 is performed based on the L2, the case where each of the switching devices SWa to SWe is the L2 switch is taken as an example here.

The two ring ports Pr[1] and Pr[2] are each connected to the ring network 10. In other words, each of the switching devices SWa to SWe is connected via the ring ports Pr[1] and Pr[2] in a ring shape, so that the ring network 10 is formed. In the example of FIG. 1, the ring ports (first ports) Pr[1] of the switching devices SWa, SWb, SWc, SWd and SWe are connected to the ring ports (second ports) Pr[2] of the neighboring switching devices SWb, SWc, SWd, SWe and SWa via a communication line, respectively.

The user ports Pu[1] to Pu[m] are connected to predetermined user networks. In the example of FIG. 1, the user ports Pu[1] to Pu[m] of the switching devices SWa to SWe are connected to user networks 11*a* to 11*e*, respectively. In each of the user networks 11*a* to 11*e*, switching devices, various information processing devices (server device, terminal device and others) and others are arranged appropriately.

Here, based on ITU-T G.8032, the switching device SWa is set as an owner node, and the switching device SWb is set as a neighbor node. A link between the owner node and the neighbor node is referred to as RPL (Ring Protection Link). When there is no fault on the ring network 10, the switching device SWa sets the ring port Pr[1] located at one end of the RPL to a block state BK, and the switching device SWb sets the ring port Pr[2] located at the other end of RPL to the block state BK. The port controlled to the block state BK blocks frames from passing through it.

When there is no fault on the ring network 10, this RPL prevents the looping of a communication path on the ring network 10. More specifically, as illustrated in FIG. 1, a communication path 12 via the switching devices SWe, SWd and SWc is formed between the switching device SWa and the switching device SWb. Frame transfer between the user networks 11*a* to 11*e* is performed on this communication path 12.

Figure 2:
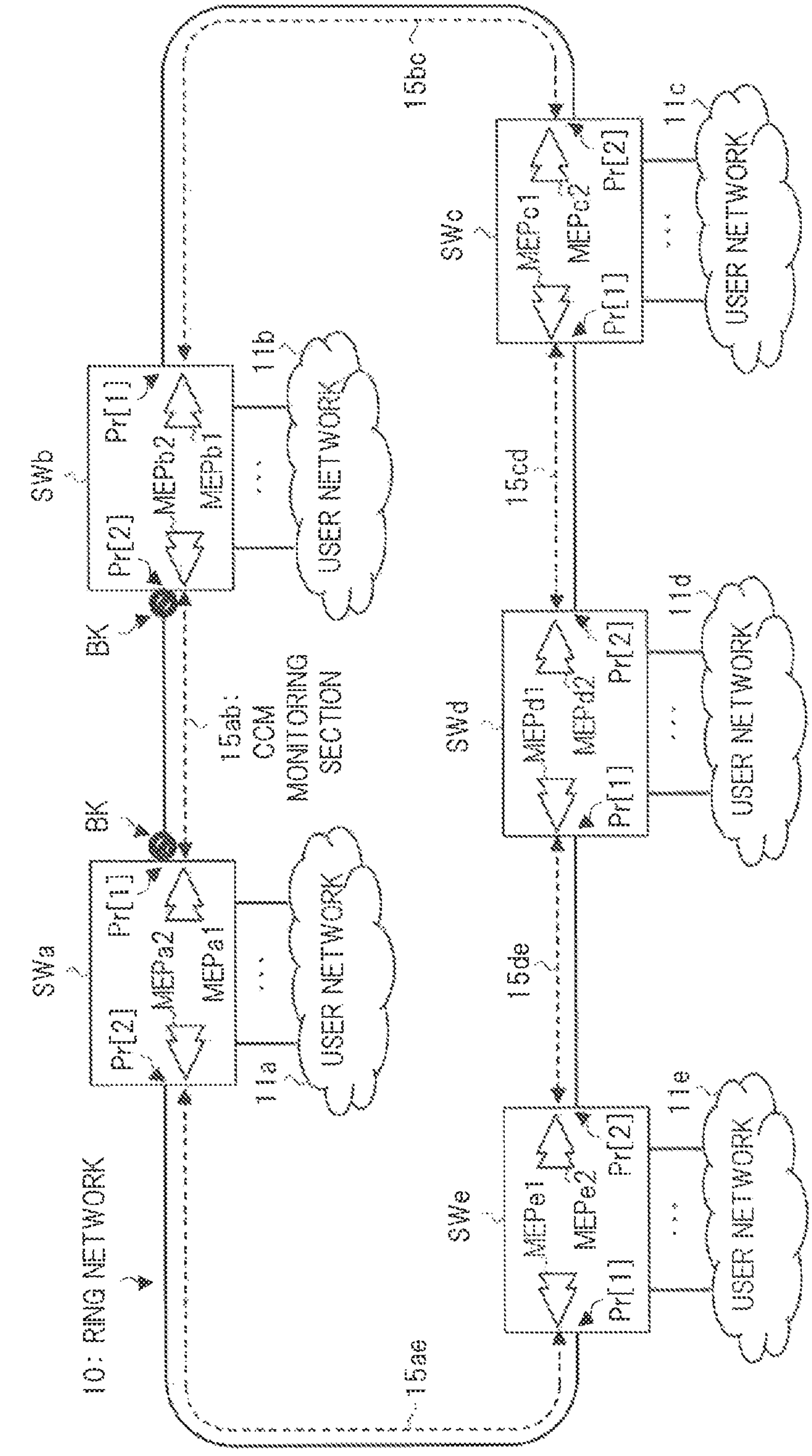
FIG. 2 is a schematic diagram illustrating an example of a fault monitoring method in the relay system of FIG. 1.

FIG. 2 is a schematic diagram illustrating an example of a fault monitoring method in the relay system of FIG. 1. As illustrated in FIG. 2, the switching devices SWa to SWe are provided with monitoring points (first monitoring points) MEPa1 to MEPe1 corresponding to the ring ports (first ports) Pr[1] respectively, and are provided with monitoring points (second monitoring points) MEPa2 to MEPe2 corresponding to the ring ports (second ports) Pr[2] respectively.

Here, ITU-T G.8032 specifies that a CC (Continuity check) function of Ethernet OAM is used for monitoring presence or absence of fault in a link between the switching devices. Ethernet OAM has been standardized by "ITU-T Y.1731" and "IEEE802.1ag", etc. as a standard for monitoring the continuity between devices. In the CC function, a monitoring section is set by monitoring points referred to as MEP (Maintenance End Point) as illustrated in FIG. 2. MEPs at both ends of each monitoring section monitor the continuity of each monitoring section by transmitting and receiving a CCM (Continuity Check Message) frame which is a continuity monitoring frame at regular intervals.

In the example of FIG. 2, the first monitoring point MEPa1 of the switching device SWa sets a CCM monitoring section 15*ab* between itself and the second monitoring point MEPb2 of another device (SWb), thereby monitoring the continuity between the first port Pr[1] of its own device and the second port Pr[2] of the other device (SWb) connected thereto. Meanwhile, the second monitoring point MEPb2 of the switching device SWb also sets the CCM monitoring section 15*ab* between itself and the first monitoring point MEPa1 of another device (SWa), thereby monitoring the continuity between the second port Pr[2] of its own device and the first port Pr[1] of the other device (SWa) connected thereto.

Similarly, the first monitoring point MEPb1 of the switching device SWb sets a CCM monitoring section 15*bc* between itself and the second monitoring point MEPc2 of another device (SWc), thereby monitoring the continuity between the first port Pr[1] of its own device and the second port Pr[2] of the other device (SWc) connected thereto. Meanwhile, the second monitoring point MEPc2 of the switching device SWc also sets the CCM monitoring section 15*bc* between itself and the first monitoring point MEPb1 of another device (SWb), thereby monitoring the continuity between the second port Pr[2] of its own device and the first port Pr[1] of the other device (SWb) connected thereto.

Thereafter, the CCM monitoring sections are sequentially set on the ring network 10 in the same manner. More specifically, a CCM monitoring section 15*cd* is set between the first port Pr[1](first monitoring point MEPc1) of the switching device SWc and the second port Pr[2](second monitoring point MEPd2) of the switching device SWd. A CCM monitoring section 15*de* is set between the first port Pr[1](first monitoring point MEPd1) of the switching device SWd and the second port Pr[2](second monitoring point MEPe2) of the switching device SWe. A CCM monitoring section 15*ae* is set between the first port Pr[1](first monitoring point MEPe1) of the switching device SWe and the second port Pr[2](second monitoring point MEPa2) of the switching device SWa.

In each CCM monitoring section (for example, 15*ab*), the monitoring point of one end (MEPa1) recognizes the continuity with respect to the monitoring point of the other end (MEPb2) as a LOC (Loss Of Continuity) state when it does not receive a CCM frame from the monitoring point of the other end (MEPb2) within a predetermined period. This predetermined period is, for example, 3.5 times as long as a transmission interval (typically 3.3 ms) of the CCM frame. In this case, the monitoring point of one end (MEPa1) transmits the CCM frame having a flag attached to a RDI (Remote Detect Indication) bit when transmitting the CCM frame to the monitoring point of the other end (MEPb2).

The monitoring point of the other end (MEPb2) recognizes the continuity with respect to the monitoring point of one end (MEPa1) as a RDI state by receiving the CCM frame having a flag attached to the RDI bit from the monitoring point of one end (MEPa1). More specifically, the LOC state with respect to a predetermined monitoring point means that a reception path from the predetermined monitoring point does not have the continuity, and the RDI state with respect to a predetermined monitoring point means that a transmission path to the predetermined monitoring point does not have the continuity. Note that, in the present specification, a CCM frame having a flag attached to a RDI bit is referred to as a RDI frame, a CCM frame having no flag attached to a RDI bit is referred to as a CC frame, and the RDI frame and CC frame are collectively referred to as a CCM frame.

Each of the switching devices SWa to SWe determines presence or absence of fault in the link connected to the ring ports Pr[1] and Pr[2] of its own device based on presence or absence of recognition of a LOC state or a RDI state in the monitoring points (MEP) of its own device. For example, the switching device SWe determines that a link connected to the ring port Pr[2] has a fault when the monitoring point MEPe2 recognizes the LOC state, and the switching device SWd determines that a link connected to the ring port Pr[1] has a fault when the monitoring point MEPd1 recognizes the RDI state. However, there is also a case where the RDI state is not included in determination criteria of the presence or absence of fault in a link, and in this case, only the switching device SWe determines that the link has a fault.

<<Problem of Relay System (Premise)>>

Figure 3:
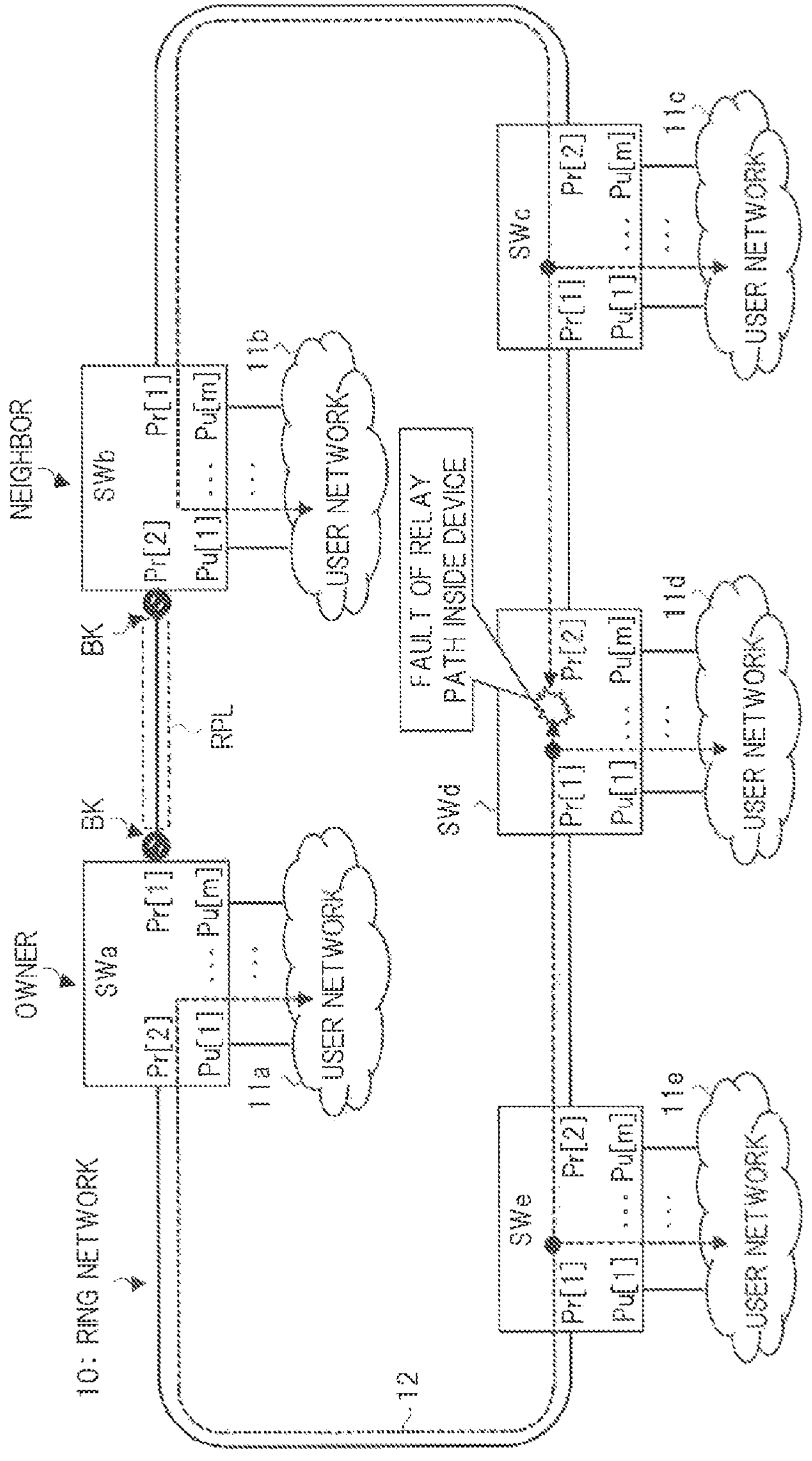
FIG. 3 is a schematic diagram illustrating an example of the problem in the relay system of FIGS. 1 and 2.

FIG. 3 is a schematic diagram illustrating an example of the problem in the relay system of FIGS. 1 and 2. In the example of FIG. 3, a fault has occurred in a relay path between the ring ports Pr[1] and Pr[2] inside the switching device SWd. However, such a fault sometimes does not have any influence on the monitoring points MEPd1 and MEPd2 of the switching device SWd illustrated in FIG. 2. In this case, the monitoring points MEPd1 and MEPd2 continue to transmit the CC frame.

Then, each of the remaining switching devices SWa, SWb, SWc and SWe cannot recognize the fault of the switching device SWd, and does not perform the path switching based on ITU-T G.8032. As a result, the frame transfer between each of the user networks 11*a*, 11*b*, 11*c* and 11*e* is performed on the communication path 12 like the case of FIG. 1. Thus, for example, the frame directed to the user network 11*c* from the user network 11*e* is blocked and lost in the switching device SWd.

<<Outline of Principal Part of Relay System (Present Embodiment)>>

Figure 4:
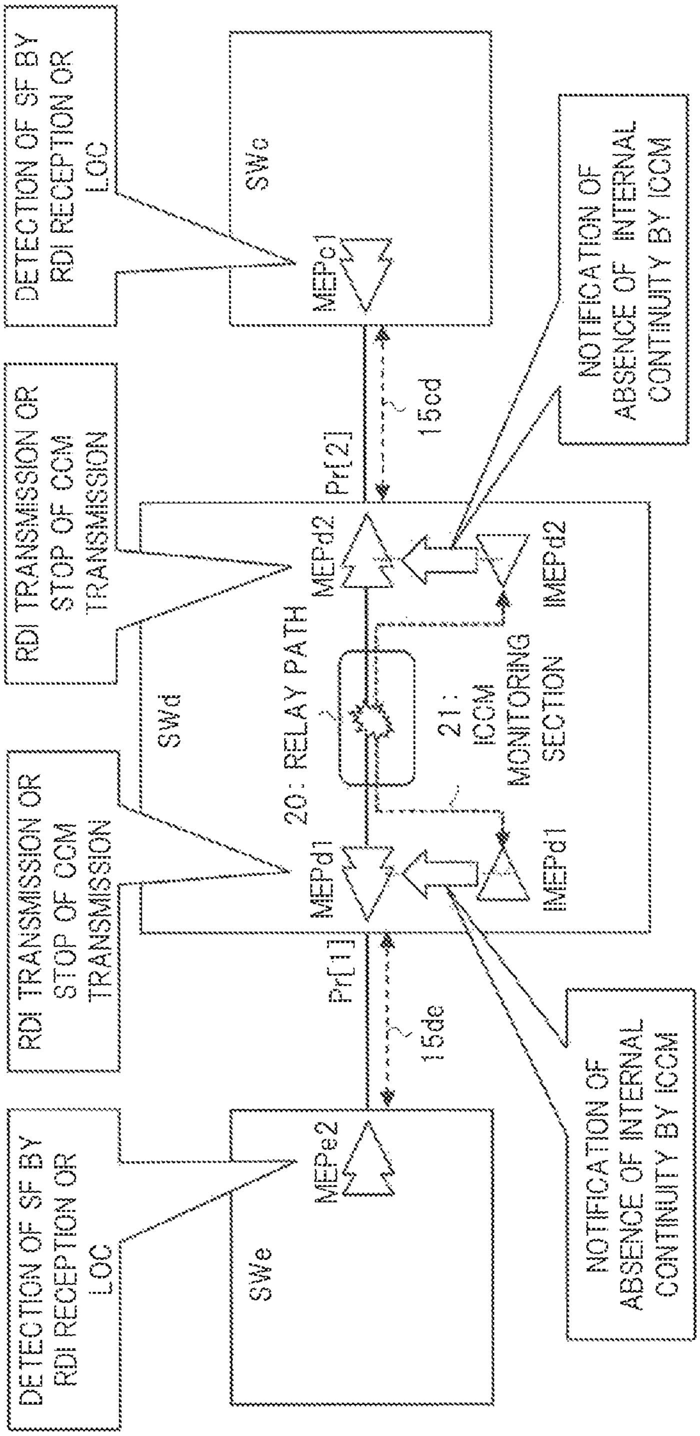
FIG. 4 is a schematic diagram illustrating a configuration example and an operation example of the principal part in the relay system according to the first embodiment of the present invention.

FIG. 4 is a schematic diagram illustrating a configuration example and an operation example of the principal part in the relay system according to the first embodiment of the present invention. In FIG. 4, parts corresponding to the switching devices SWc, SWd and SWe extracted from FIG. 3 are illustrated. The switching device SWd is provided with internal monitoring points (first and second internal monitoring points) IMEPd1 and IMEPd2 in addition to the above-mentioned monitoring points (first and second monitoring points) MEPd1 and MEPd2. The first and second internal monitoring points IMEPd1 and IMEPd2 are provided so as to correspond to the first and second monitoring points MEPd1 and MEPd2, respectively.

Each of the first and second internal monitoring points IMEPd1 and IMEPd2 sets an ICCM monitoring section 21 between itself and the other, thereby monitoring the continuity inside the device (hereinafter, referred to as internal continuity) between the first monitoring point MEPd1 and the second monitoring point MEPd2. More concretely, the first and second internal monitoring points IMEPd1 and IMEPd2 monitor the internal continuity by transmitting and receiving an internal continuity monitoring frame (referred to as an ICCM frame in the present specification) in the ICCM monitoring section 21 at regular intervals. The ICCM monitoring section 21 includes a relay path 20 between the first monitoring point MEPd1 (substantially equivalent to the ring port Pr[1]) and the second monitoring point MEPd2 (substantially equivalent to the ring port Pr[2]).

The internal continuity monitoring frame (ICCM frame) is a frame similar to the continuity monitoring frame (CCM frame) mentioned above. Namely, in the present embodiment, the method similar to that of an Ethernet OAM standard for monitoring the continuity between devices is applied to the monitoring of the continuity inside a device. Then, as a monitoring frame for monitoring the continuity inside a device, an ICCM frame is used in place of a CCM frame. When the internal continuity is monitored by using the ICCM frame, the presence or absence of internal continuity (presence or absence of fault) is determined based on the presence or absence of recognition of a LOC state and a RDI state like the case of the CCM frame mentioned above. In addition, though not particularly limited, a transmission interval of the ICCM frame is desirably equivalent to or shorter than the transmission interval of the CCM frame.

For example, as illustrated in FIG. 4, when a fault is present in the relay path 20, at least one of the first and second internal monitoring points IMEPd1 and IMEPd2 (for example, IMEPd1) does not receive the ICCM frame from the other (IMEPd2) within a predetermined period, and recognizes the internal continuity with respect to the other internal monitoring point as a LOC state. This predetermined period is, for example, 3.5 times as long as the transmission interval of the ICCM frame. In this case, the other internal monitoring point (IMEPd2) recognizes the internal continuity with respect to the one internal monitoring point (IMEPd1) as a RDI state. Note that both of the first and second internal monitoring points IMEPd1 and IMEPd2 may recognize a LOC state depending on a fault status of the relay path 20.

Here, the switching device SWd (ring control unit therein (not shown)) instructs the first and second monitoring points MEPd1 and MEPd2 to transmit the RDI frame or instructs them to stop the transmission of the CCM frame when the first internal monitoring point IMEPd1 or the second internal monitoring point IMEPd2 does not receive the ICCM frame within a predetermined period. For example, as mentioned above, when a RDI state is not included in the fault determination criteria of the ring network 10, the ring control unit instructs the stop of transmission of the CCM frame.

Though not particularly limited, the ring control unit may be separately placed on a communication path between the first internal monitoring point IMEPd1 and the first monitoring point MEPd1 and on a communication path between the second internal monitoring point IMEPd2 and the second monitoring point MEPd2. In this case, one of the ring control units gives the above-mentioned instruction to the first monitoring point MEPd1 in accordance with a determination result indicative of the absence of internal continuity (for example, recognition of the LOC state) in the first internal monitoring point IMEPd1. The other of the ring control units gives the above-mentioned instruction to the second monitoring point MEPd2 in accordance with a determination result indicative of the absence of internal continuity (for example, recognition of the RDI state) in the second internal monitoring point IMEPd2.

For example, in the case of a chassis type switching device, the first internal monitoring point IMEPd1 and the first monitoring point MEPd1 are disposed in a line card different from that of the second internal monitoring point IMEPd2 and the second monitoring point MEPd2 in some cases. In such a case, by separately disposing the ring control units in each of the line cards, one of the ring control units can give the above-mentioned instruction to the monitoring point (MEPd1 or MEPd2) of its own line card without particularly communicating with the other of the ring control units.

The first and second monitoring points MEPd1 and MEPd2 both transmit the RDI frame or stop the transmission of the CCM frame in accordance with the instruction from the ring control unit. As a result, the first monitoring point MEPc1 of the switching device SWc and the second monitoring point MEPe2 of the switching device SWe both recognize the RDI state by receiving the RDI frame, or recognize the LOC state without receiving the CCM frame within a predetermined period.

As a result, the switching devices SWc and SWe both detect the fault of a link and transmit a R-APS (SF) frame. Here, the R-APS (SF) frame functions as a fault notification frame. The R-APS frame is a kind of a control frame based on Ethernet OAM, and is recognized by information of an OpCode region in the frame or the like. SF denotes a signal failure (Signal Fail).

<<Operation of Relay System at the Time of Fault Presence (Present Embodiment)>>

Figure 5:
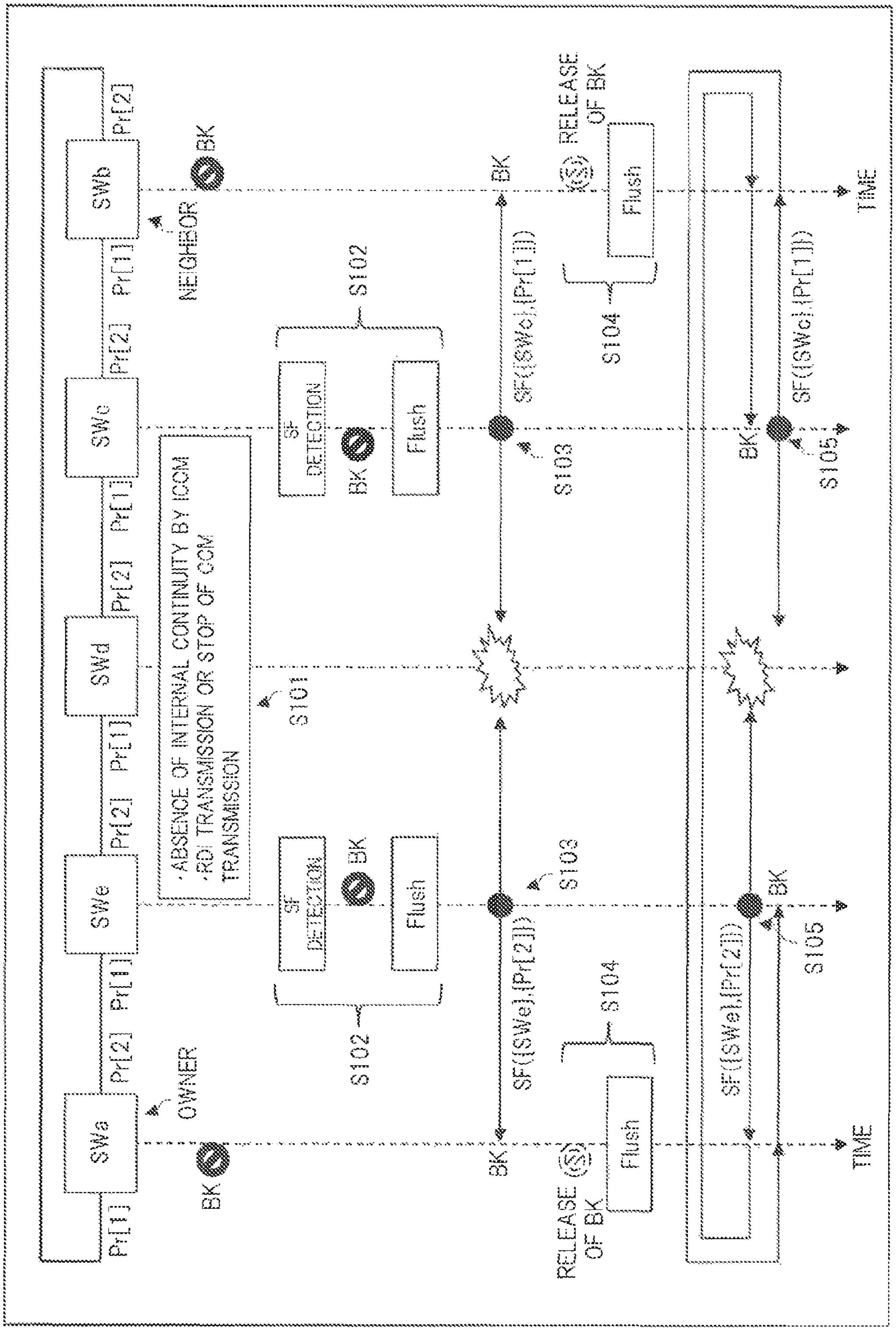
FIG. 5 is a diagram schematically illustrating an example of an operation sequence in the case where a fault inside the device illustrated in FIG. 4 occurs in the relay system of FIGS. 1 and 4.

FIG. 5 is a diagram schematically illustrating an example of an operation sequence in the case where a fault inside the device illustrated in FIG. 4 occurs in the relay system of FIGS. 1 and 4. In FIG. 5, first, the ring port Pr[1] of the switching device SWa serving as an owner node and the ring port Pr[2] of the switching device SWb serving as a neighbor node are both controlled to a block state BK. In this state, as illustrated in FIG. 4, the switching device SWd instructs the first and second monitoring points MEPd1 and MEPd2 to transmit a RDI frame or instructs them to stop the transmission of the CCM frame when the absence of internal continuity is determined based on an ICCM frame (Step S101).

By Step S101, the switching device SWc detects the fault of the switching device SWd as a fault (SF) of a link connected to the ring port Pr[1]. In response to this, the switching device SWc controls the ring port Pr[1] to a block state BK, and flushes (deletes) an address table (FDB (Forwarding DataBase)) (Step S102). In the same way, the switching device SWe also detects the fault of the switching device SWd as a fault (SF) of a link connected to the ring port Pr[2]. In response to this, the switching device SWe controls the ring port Pr[2] to a block state BK, and flushes (deletes) the address table (FDB) (Step S102).

Subsequently, the switching device SWc which has detected the fault (SF) transmits a R-APS (SF) frame containing information of the ring port controlled to the block state BK to the ring network 10 (Step S103). The information of the ring port controlled to the block state BK contains an identifier of the switching device SWc {SWc} and an identifier of the ring port Pr[1]{Pr[1]}. In this way, in the present specification, {AA} is assumed to denote an identifier of "AA". Similarly, the switching device SWe also transmits a R-APS (SF) frame containing information of the ring port controlled to the block state BK ({SWe} and {Pr[2]}) to the ring network 10 (Step S103).

The R-APS (SF) frames transmitted by the switching devices SWc and SWe are relayed by each switching device until reaching a ring port in a block state BK. Here, when the switching device SWa serving as an owner node has received the R-APS (SF) frame, the switching device SWa releases the block state BK of the ring port Pr[1](that is, changes the state into an open state), and flushes (deletes) the address table (FDB) (Step S104).

In the same way, when the switching device SWb serving as a neighbor node has received the R-APS (SF) frame, the switching device SWb releases the block state BK of the ring port Pr[2](that is, changes the state into an open state), and flushes (deletes) the address table (FDB) (Step S104). After that, the R-APS (SF) frame is transmitted at regular intervals by the switching devices SWc and SWe, and a steady state is reached (Step S105).

Figure 6:
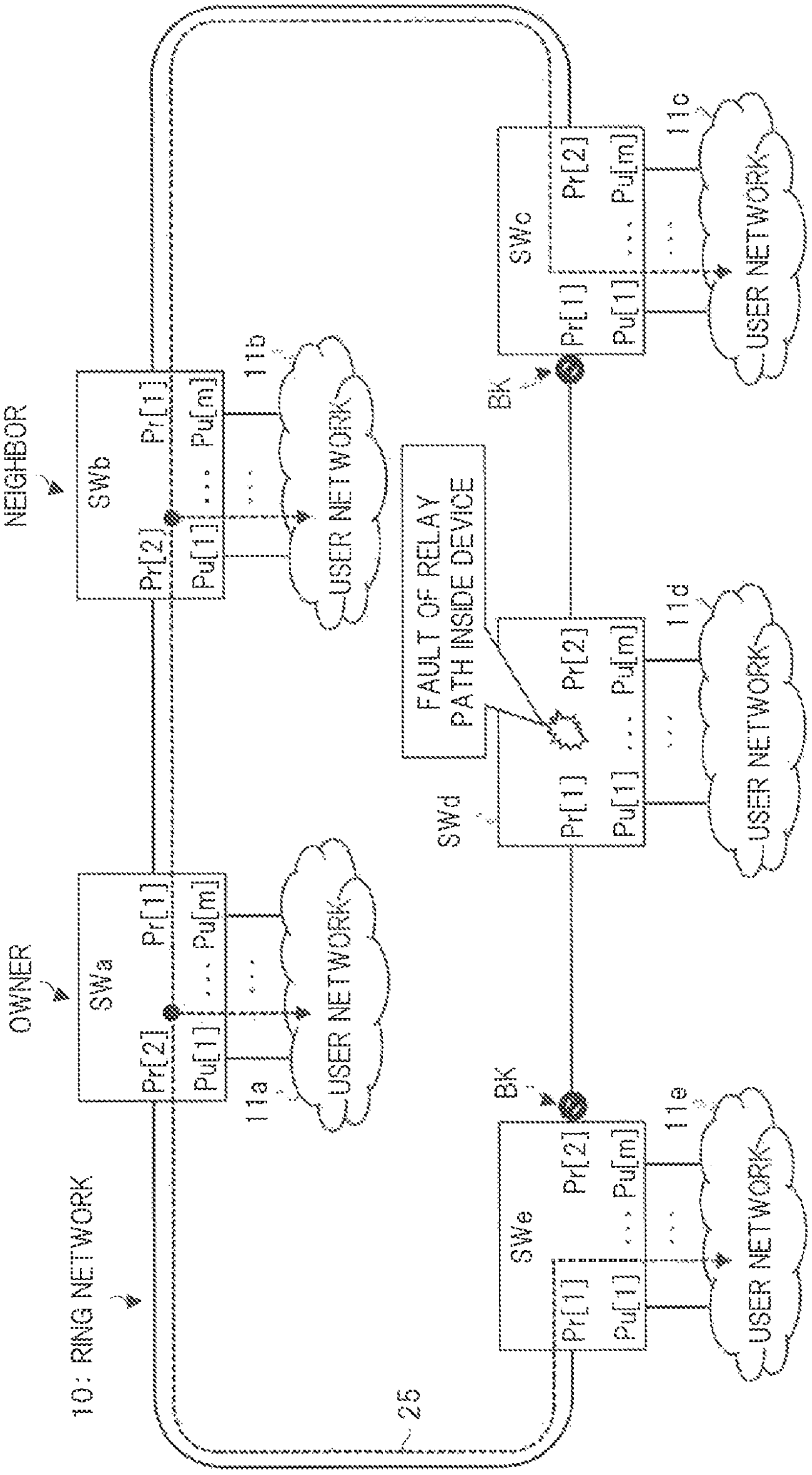
FIG. 6 is a diagram illustrating a frame transfer path after path switching of the ring network is performed by the operation of FIG. 5.

FIG. 6 is a diagram illustrating a frame transfer path after path switching of the ring network is performed by the operation of FIG. 5. When the operation of FIG. 5 has been executed and the steady state (Step S105) has been reached, a communication path 25 via the switching devices SWa and SWb is formed between the switching device SWe and the switching device SWc as illustrated in FIG. 6. The frame transfer between the user networks 11*e*, 11*a*, 11*b* and 11*c* is performed on this communication path 25. As a result, for example, a frame directed to the user network 11*c* from the user network 11*e* reaches the user network 11*c* without being lost via the communication path 25 unlike the case of FIG. 3.

<<Operation of Relay System at the Time of Fault Recovery (Present Embodiment)>>

Figure 7:
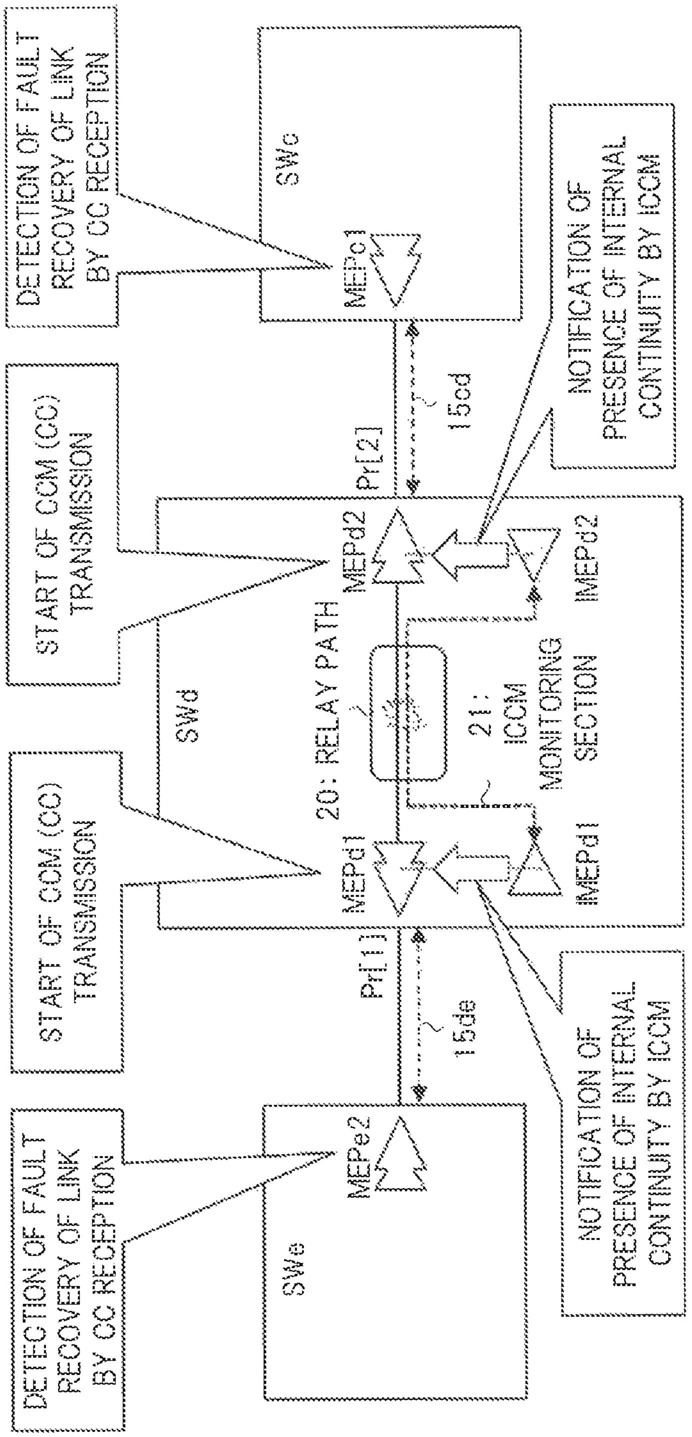
FIG. 7 is a schematic diagram illustrating a configuration example and an operation example of the principal part at the time of the fault recovery in the relay system of FIG. 4.

FIG. 7 is a schematic diagram illustrating a configuration example and an operation example of the principal part at the time of the fault recovery in the relay system of FIG. 4. In FIG. 7, in the same configuration example as the case of FIG. 4, an operation example in the case where the fault of the relay path 20 of the switching device SWd has been recovered unlike the case of FIG. 4 is illustrated. In this case, the first and second internal monitoring points IMEPd1 and IMEPd2 both determine that the ICCM monitoring section 21 has the internal continuity because they receive the ICCM frame within a predetermined period.

The switching device SWd (ring control unit therein (not shown)) instructs the first and second monitoring points MEPd1 and MEPd2 to transmit the CCM frame when both of the first and second internal monitoring points IMEPd1 and IMEPd2 have received the ICCM frame within a predetermined period. The first and second monitoring points MEPd1 and MEPd2 both start to transmit the CCM frame (CC frame when CCM monitoring sections 15*cd* and 15*de* are normal) in accordance with the instruction from the ring control unit.

As a result, the first monitoring point MEPc1 of the switching device SWc and the second monitoring point MEPe2 of the switching device SWe both receive the CC frame within a predetermined period. Thus, the switching devices SWc and SWe both detect the fault recovery of the link, and transmit a R-APS (NR) frame. Here, the R-APS (NR) frame functions as a fault recovery notification frame. NR denotes absence of request (No Request).

Figure 8:
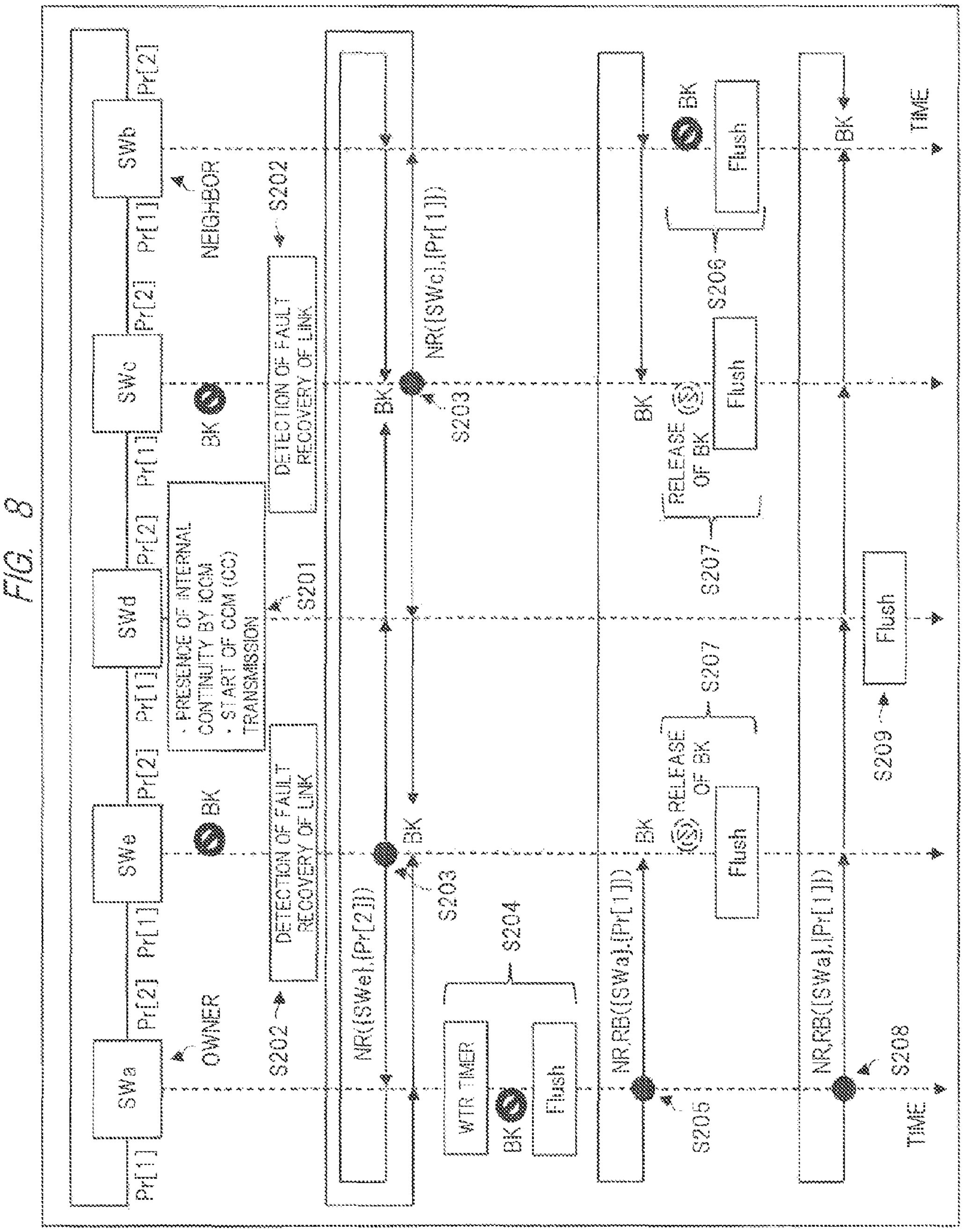
FIG. 8 is a diagram schematically illustrating an example of an operation sequence in the case where the fault inside the device illustrated in FIG. 7 has been recovered in the relay system of FIGS. 1 and 7.

FIG. 8 is a diagram schematically illustrating an example of an operation sequence in the case where the fault inside the device illustrated in FIG. 7 has been recovered in the relay system of FIGS. 1 and 7. In FIG. 8, as illustrated in FIGS. 5 and 6, first, the ring port Pr[1] of the switching device SWc and the ring port Pr[2] of the switching device SWe are both controlled to a block state BK. In this state, as illustrated in FIG. 7, the switching device SWd instructs the first and second monitoring points MEPd1 and MEPd2 to transmit a CCM frame when the presence of internal continuity is determined based on the ICCM frame (Step S201).

By the step S201, the switching device SWc detects the fault recovery of the link connected to the ring port Pr[1], and the switching device SWe also detects the fault recovery of the link connected to the ring port Pr[2](Step S202). In response to this, the switching device SWc transmits the R-APS (NR) frame containing the information of the ring port controlled to the block state BK ({SWc} and {Pr[1]}) to the ring network 10. Similarly, the switching device SWe also transmits the R-APS (NR) frame containing the information of the ring port controlled to the block state BK ({SWe} and {Pr[2]}) to the ring network 10 (Step S203).

The R-APS (NR) frame transmitted by the switching devices SWc and SWe is relayed by each switching device until reaching a ring port in a block state BK. Here, when the switching device SWa serving as an owner node has received the R-APS (NR) frame, the switching device SWa starts a WTR (Wait to Restore) timer. The switching device SWa controls the ring port Pr[1] to a block state BK when a new request is not received within a period of the WTR timer, and flushes (deletes) the address table (FDB) (Step S204).

Thereafter, the switching device SWa transmits a R-APS (NR, RB) frame containing information of the ring port controlled to the block stateBK ({SWa} and {Pr[1]}) to the ring network 10 (Step S205). Here, the R-APS (NR, RB) frame functions as a fault switch-back frame. RB denotes the block of RPL (RPL Blocked). The R-APS (NR, RB) frame transmitted by the switching device SWa is relayed by each switching device until reaching a ring port in a block state BK.

Here, when the switching device SWb serving as a neighbor node has received the R-APS (NR, RB) frame, the switching device SWb controls the ring port Pr[2] to a block state BK, and flushes (deletes) the address table (FDB) (Step S206). In addition, when the switching device SWc has received the R-APS (NR, RB) frame, the switching device SWc releases the block state BK of the ring port Pr[1], and flushes (deletes) the address table (FDB) (Step S207). In the same way, when the switching device SWe has received the R-APS (NR, RB) frame, the switching device SWe releases the block state BK of the ring port Pr[2], and flushes (deletes) the address table (FDB) (Step S207).

In addition, when the R-APS (NR, RB) frame is transmitted again by the switching device SWa (Step S208), the switching device SWd receives the R-APS (NR, RB) frame, and flushes (deletes) the address table (FDB) (Step S209). After that, the R-APS (NR, RB) frame is transmitted at regular intervals by the switching device SWa, and a steady state is reached. As a result, the state as illustrated in FIG. 1 is recovered. Note that, when the R-APS frame is newly transmitted, for example, it is transmitted 3 times every 3.3 ms, and is thereafter transmitted every 5 s.

As mentioned above, by using the relay system and relay device (switching device) of FIG. 4, FIG. 7 and others, it becomes possible to switch a communication path in the ring network appropriately in accordance with an internal failure of the relay device. As a result, it is possible to prevent the frame loss and the like. Such an effect becomes advantageous particularly when a ring protocol specified by ITU-T G.8032 is used.

Note that, although the case where an internal fault occurs in the switching device SWd has been taken as an example in FIGS. 4 and 7, the same method can be used also in the case where an internal fault occurs in the other switching devices SWa, SWb, SWc and SWe of FIG. 1. For example, although ITU-T G.8032 is a specification which is applicable also to multiple faults, by using the method of the present first embodiment, it is possible to pretend as if multiple faults occur in the links on both sides of the switching device in a pseudo manner when an internal fault occurs in the switching device.

<<Configuration of Relay Device (Present Embodiment)>>

Figure 9:
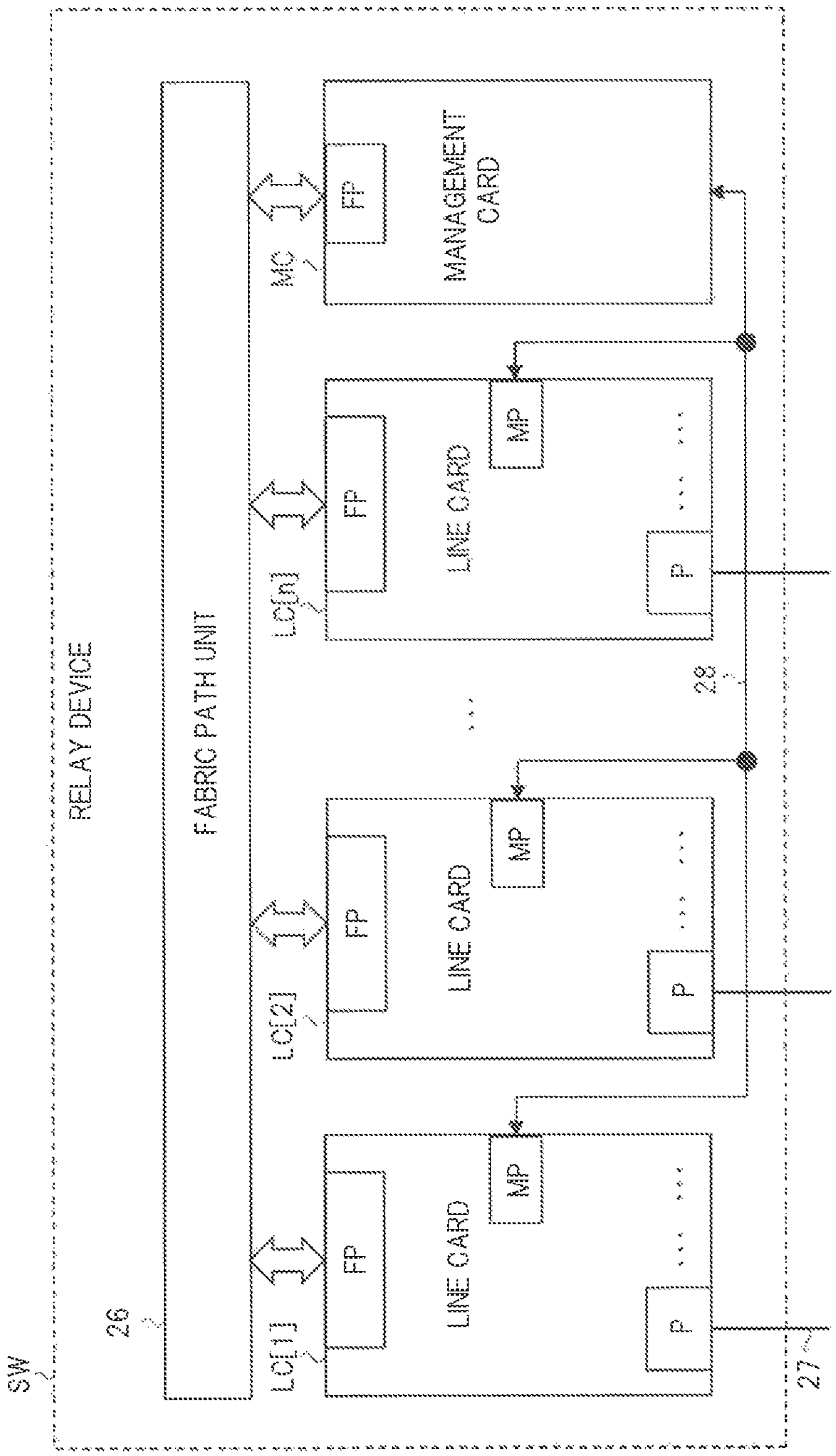
FIG. 9 is a schematic diagram illustrating a configuration example of the switching device (relay device) in the relay system of FIGS. 1 and 4.

FIG. 9 is a schematic diagram illustrating a configuration example of the switching device (relay device) in the relay system of FIGS. 1 and 4. In this case, the switching device (relay device) SW illustrated in FIG. 9 is a chassis type switching device in which a plurality of cards are mounted in one chassis. Although this switching device SW corresponds to the switching device SWd of FIG. 4, it is not limited to this and may be any of the other switching devices SWa, SWb, SWc and SWe of FIG. 1.

The switching device (relay device) SW of FIG. 9 is provided with a plurality of (here, n) line cards LC[1] to LC[n], a management card MC, and a fabric path unit 26. Each of the line cards LC[1] to LC[n] performs frame communication (transmission and reception) with the outside of the device. The fabric path unit 26 relays the frame between the plurality of line cards LC[1] to LC[n]. In addition, in this case, the fabric path unit 26 relays the frame also between the plurality of line cards LC[1] to LC[n] and the management card MC.

The management card MC manages the n line cards LC[1] to LC[n] and others. Only one management card MC is illustrated here, but actually, a plurality of management cards MC are provided for enhancing availability. Each of the line cards LC[1] to LC[n] is provided with one or a plurality of external ports P, a fabric terminal FP, and a management card terminal MP. Each external port P corresponds to any of the ring ports Pr[1] and Pr[2] and the user ports Pu[1] to Pu[m] of FIG. 1, and is connected to a communication line 27 such as an Ethernet line. The management card terminal MP is connected to the management card MC via a management communication line 28.

The fabric terminal FP is connected to the fabric path unit 26, and is connected to the fabric terminal FP of other line cards (and management card) via the fabric path unit 26. Here, for example, the fabric path unit 26 may be made up of a fabric card having a switching function, and may be made up of a wiring board (backplane) in which a slot for detaching and attaching each card is provided.

When the fabric path unit 26 is made up of a fabric card, the fabric terminal FP is connected to the fabric card, and is connected to the fabric terminal FP of other line cards through switching by the fabric card. When the fabric path unit 26 is made up of a backplane, the fabric terminal FP is made up of a plurality of terminals, and the plurality of terminals are respectively connected to the corresponding terminals of other line cards (and management card) via a full-mesh communication line provided on the backplane.

Figure 10:
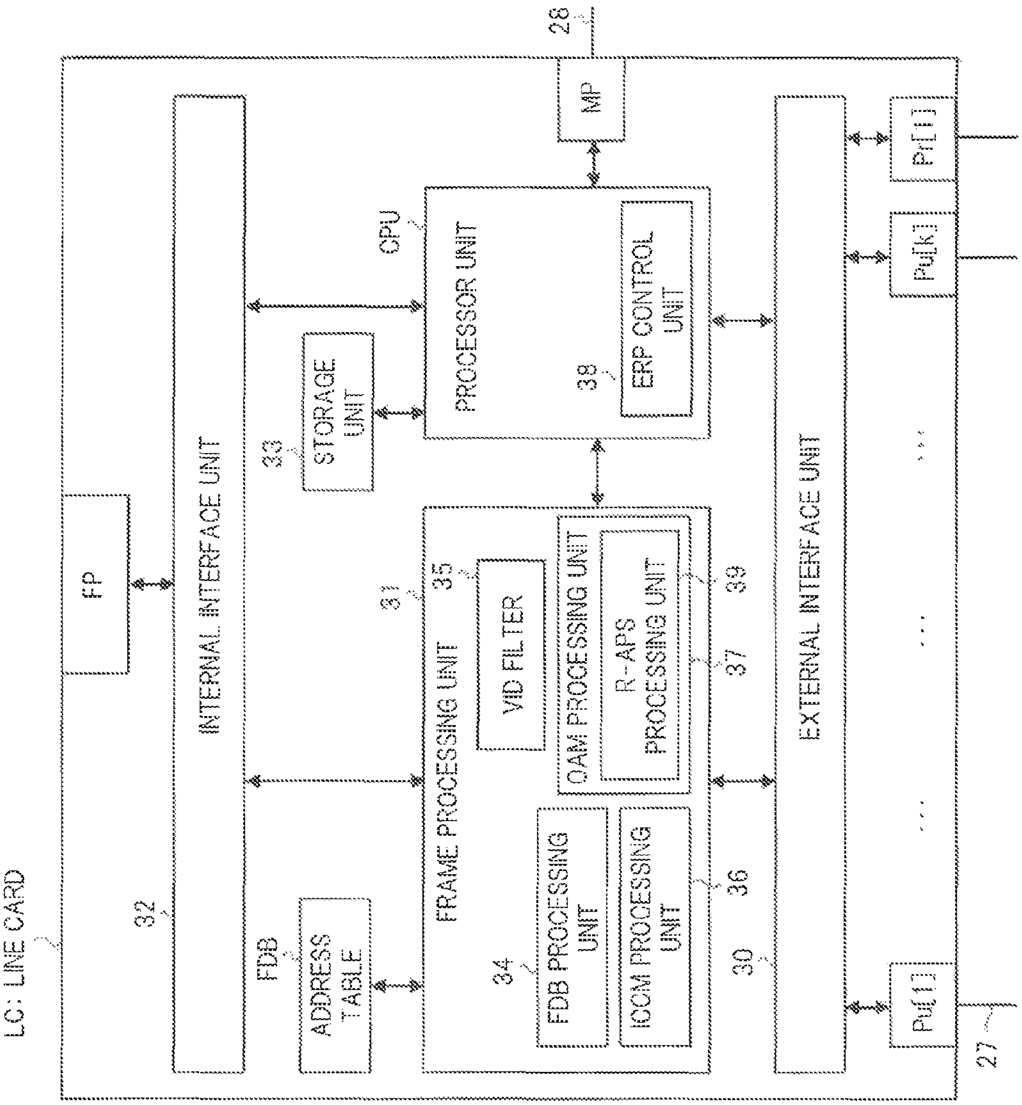
FIG. 10 is a block diagram illustrating a configuration example of each line card in the relay device of FIG. 9.

FIG. 10 is a block diagram illustrating a configuration example of each line card in the relay device of FIG. 9. In FIG. 10, for convenience of description, a case where k user ports Pu[1] to Pu[k] and one ring port Pr[1] are mounted as the external ports P on one line card LC is taken as an example. However, actually, it is possible to freely determine on which of the line cards LC[1] to LC[n] each of the ring ports Pr[1] and Pr[2] and the user ports Pu[1] to Pu[m] is mounted.

In FIG. 10, when an external interface unit 30 has received a frame at any of the user ports Pu[1] to Pu[k] and the ring port Pr[1], it adds a port identifier (referred to as a reception port identifier) indicating the line card and external port which have received the frame, and then transmits it to a frame processing unit 31 or a processor unit CPU. In addition, the external interface unit 30 transmits a frame from the frame processing unit 31 or the processor unit CPU to any of the user ports Pu[1] to Pu[k] and the ring port Pr[1].

The address table FDB retains a correspondence relation among the port identifier, a MAC (Media Access Control) address of a terminal or the like present ahead of a line card and external port indicated by the port identifier, and a VLAN (Virtual LAN) identifier (VID) corresponding to the MAC address. The frame processing unit 31 is provided with an FDB processing unit 34, a VID filter 35, an ICCM processing unit 36 and an OAM processing unit 37.

When the FDB processing unit 34 has received a frame (for example, user frame) at any of the user ports Pu[1] to Pu[k] and the ring port Pr[1], the FDB processing unit 34 performs learning of the address table FDB and retrieval of the destination of the frame based on the address table FDB. Concretely, when the FDB processing unit 34 has received a user frame via the external interface unit 30, the FDB processing unit 34 learns a source MAC address contained in the user frame in the address table FDB in association with the reception port identifier and the VLAN identifier.

In addition, the FDB processing unit 34 retrieves the address table FDB by using the destination MAC address contained in the user frame received via the external interface unit 30 and the VLAN identifier corresponding thereto as search keys. The FDB processing unit 34 adds a port identifier (referred to as a destination port identifier) acquired by this retrieval result to a user frame together with the reception port identifier mentioned above. The destination port identifier is made up of an identifier of a destination line card and an identifier of a destination external port.

The VID filter 35 determines whether or not a frame may be relayed in accordance with the VLAN identifier. For example, the block state BK illustrated in FIG. 1 and others is realized by this VID filter 35. The ICCM processing unit 36 is provided with the internal monitoring points (IMEPd1 and IMEPd2) illustrated in FIG. 4, and monitors the internal continuity and determines presence or absence of the internal continuity. The OAM processing unit 37 is provided with the monitoring points (MEPd1 and MEPd2) illustrated in FIG. 4 and others, and monitors the continuity and determines presence or absence of the continuity based on Ethernet OAM. In addition, the OAM processing unit 37 is provided with a R-APS processing unit 39. The R-APS processing unit 39 performs the process of the R-APS frame based on ITU-T G.8032 (specifically, transmission, reception and relaying).

The processor unit CPU performs the various communication protocol processes, for which complicated process is required, in cooperation with the frame processing unit 31 or manages its own line card based on software (firmware) stored in a storage unit 33. The processor unit CPU is provided with an ERP control unit 38 configured by executing firmware. The ERP control unit 38 performs various controls based on the ring protocol specified by ITU-T G.8032. In addition, the processor unit CPU communicates with the management card MC via the management card terminal MP. An internal interface unit 32 controls frame communication between the frame processing unit 31 or the processor unit CPU and the fabric terminal FP.

<<User Frame Relaying Operation of Relay Device (Present Embodiment)>>

Figure 11:
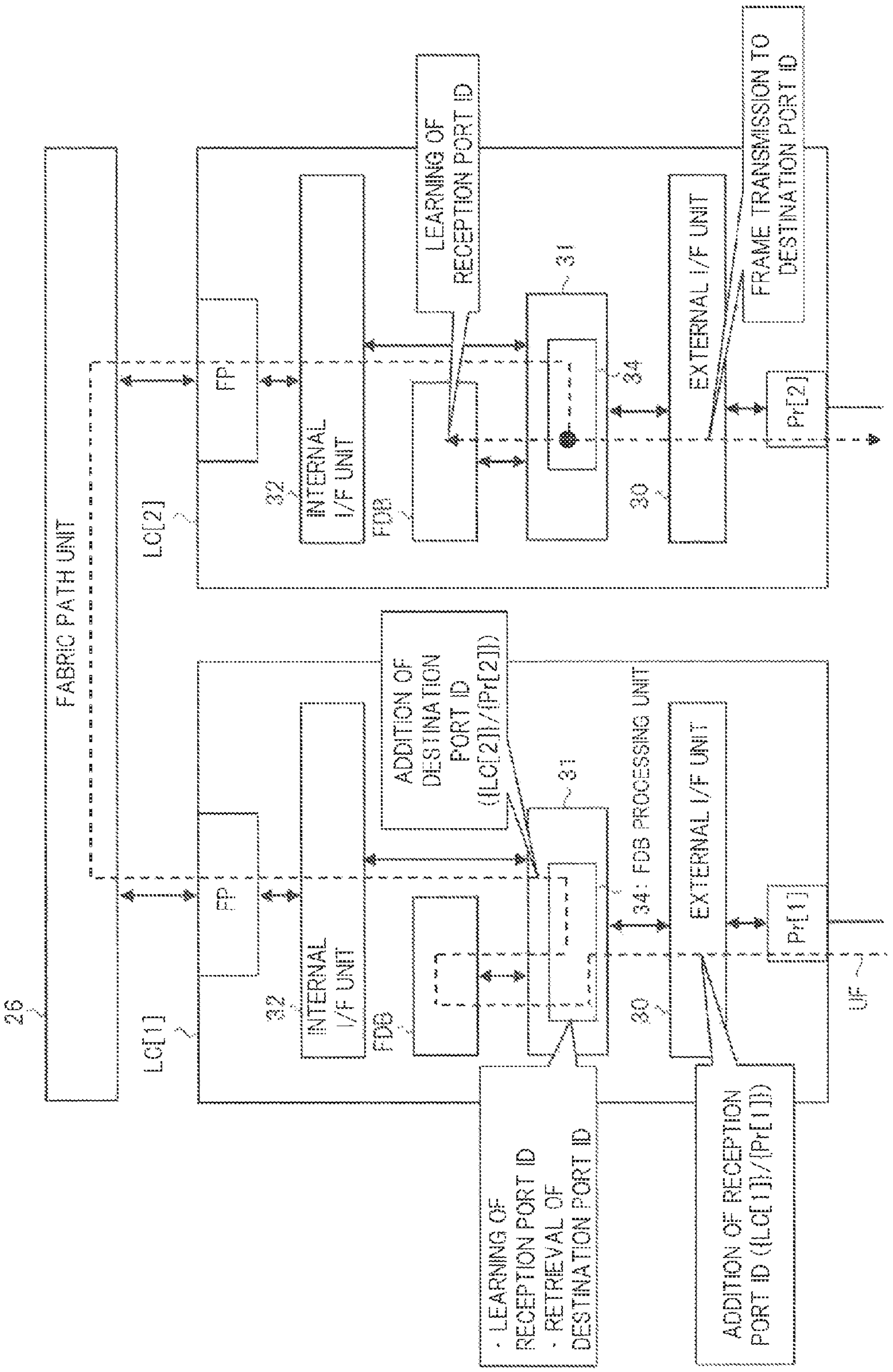
FIG. 11 is an explanatory diagram schematically illustrating an operation example at the time of relaying a user frame in the relay device of FIGS. 9 and 10.

FIG. 11 is an explanatory diagram schematically illustrating an operation example at the time of relaying a user frame in the relay device of FIGS. 9 and 10. Here, it is assumed that the line card LC[1] is provided with the ring port (first port) Pr[1], and the line card LC[2] is provided with the ring port (second port) Pr[2]. Then, the case where a user frame received at the ring port Pr[1] of the line card LC[1] is relayed to the ring port Pr[2] of the line card LC[2] is assumed.

First, the external interface unit 30 of the line card LC[1] adds the reception port identifier {LC[1]}/{Pr[1]} to a user frame UF received at the ring port Pr[1], and then transmits the user frame to the frame processing unit 31. The FDB processing unit 34 in the frame processing unit 31 learns a correspondence relation among the source MAC address contained in the user frame UF, the VLAN identifier determined by a tag VLAN, port VLAN and others, and the reception port identifier {LC[I]}/{Pr[1]} in the address table FDB.

In addition, the FDB processing unit 34 retrieves the address table FDB by using the destination MAC address contained in the user frame UF and the VLAN identifier as search keys, and acquires the destination port identifier. Here, it is presupposed that the destination port identifier {LC[2]}/{Pr[2]} is acquired as the retrieval result associated with the learning of the address table FDB in the past communication. The FDB processing unit 34 adds the reception port identifier and the destination port identifier to the user frame UF, and transmits it to the fabric terminal FP via the internal interface unit 32.

Note that, at this time, the frame processing unit 31 discards the user frame UF without transmitting it to the fabric terminal FP if the VLAN identifier of the user frame UF is not allowed to be relayed by the setting of the VID filter 35. In addition, the FDB processing unit 34 relays the user frame UF to the user port if an identifier of the user port provided in its own line card is acquired as the destination port identifier. A specific relay method may be, for example, a method of looping back the frame at the internal interface unit 32 or the fabric path unit 26 as well as a method of looping back the frame at the frame processing unit 31.

The description returns to the operation of FIG. 11. The fabric path unit 26 relays the user frame UF from the fabric terminal FP of the line card LC[1] to the fabric terminal FP of the line card LC[2]. For example, when the fabric path unit 26 is made up of the fabric card, the fabric card relays the user frame UF to the line card LC[2] based on the destination port identifier {LC[2]}/{Pr[2]}. On the other hand, when the fabric path unit 26 is made up of the backplane, the internal interface unit 32 of the line card LC[1] transmits the user frame UF to the terminal corresponding to the line card LC[2] from among each of the terminals constituting the fabric terminal FP based on the destination port identifier {LC[2]}/{Pr[2]}.

The line card LC[2] transmits the user frame UF received at the fabric terminal FP to the frame processing unit 31 via the internal interface unit 32. The FDB processing unit 34 in the frame processing unit 31 learns the correspondence relation among the source MAC address contained in the user frame UF, the VLAN identifier contained (or added) in the user frame UF and the reception port identifier added to the user frame UF in the address table FDB. The external interface unit 30 of the line card LC[2] receives the user frame UF from the frame processing unit 31, and transmits the user frame UF to the ring port Pr[2] based on the destination port identifier added thereto.

Note that an operation example in which each line card performs learning of the address table FDB based on the user frame has been described here, but it is also possible to configure each line card so as to perform the learning by separately using a learning frame. In this case, the frame processing unit 31 of the line card LC[1] generates the learning frame containing the source MAC address of the user frame UF, the VLAN identifier and the reception port identifier, and transmits it to the other line cards LC[2] (and LC[3] to LC[n]). The frame processing units 31 of the other line cards LC[2] (and LC[3] to LC[n]) learn the correspondence relation among the source MAC address, the VLAN identifier and the reception port identifier contained in the learning frame in the address table FDB.

<<Internal Continuity Monitoring of Relay Device (Present Embodiment)>>

Figure 12:
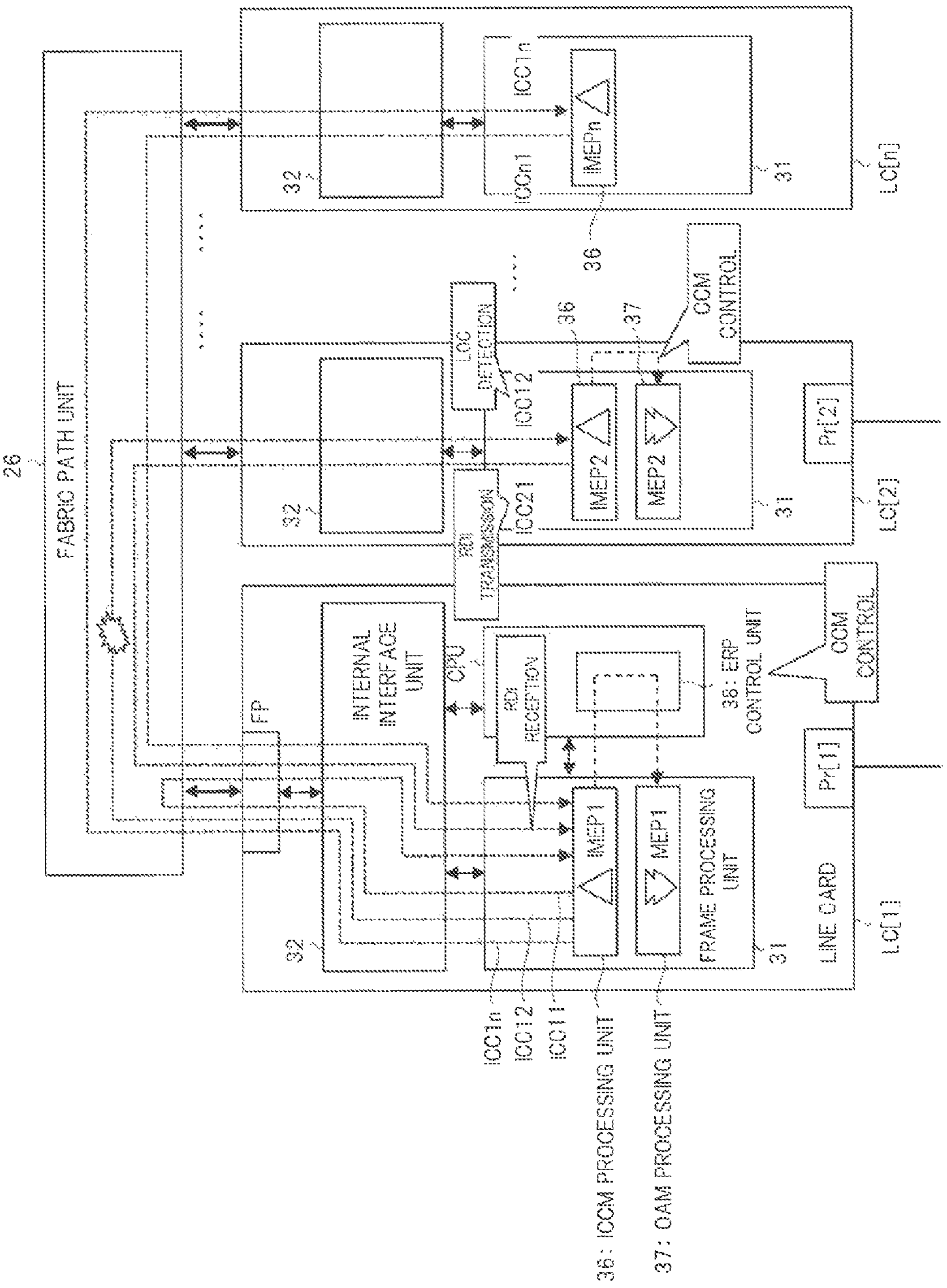
FIG. 12 is an explanatory diagram schematically illustrating an operation example around the ICCM processing unit in the relay device of FIGS. 9 and 10.

FIG. 12 is an explanatory diagram schematically illustrating an operation example around the ICCM processing unit in the relay device of FIGS. 9 and 10. In the example of FIG. 12, the line card LC[1] is provided with the ring port (first port) Pr[1], and the line card LC[2] is provided with the ring port (second port) Pr[2].

In the line card LC[1] having the ring port Pr[1], the first internal monitoring point IMEP1 is provided in the ICCM processing unit 36, and the first monitoring point MEP1 is provided in the OAM processing unit 37. In the line card LC[2] having the ring port Pr[2], the second internal monitoring point IMEP2 is provided in the ICCM processing unit 36, and the second monitoring point MEP2 is provided in the OAM processing unit 37. In this case, even in the line card LC[n] having no ring port, the internal monitoring point IMEPn is provided in the ICCM processing unit 36.

Each of the internal monitoring points IMEP1, IMEP2 and IMEPn monitors the internal continuity with respect to each of the other line cards LC as well as its own line card by using the internal continuity monitoring frames (ICCM frame) as illustrated in FIG. 4. In the example of FIG. 12, the first internal monitoring point IMEP1 transmits an ICCM frame ICC12 at regular intervals via the fabric path unit 26 to the second internal monitoring point IMEP2. The transmission interval of the ICCM frame is not particularly limited, but may be, for example, every 1 ms.

In the same way, the second internal monitoring point IMEP2 transmits an ICCM frame ICC21 at regular intervals via the fabric path unit 26 to the first internal monitoring point IMEP1. The communication path of the ICCM frames ICC12 and ICC21 is overlapped with the communication path of the user frame UF illustrated in FIG. 11, and is overlapped with the relay path 20 between the first monitoring point MEPd1 (ring port Pr[1]) and the second monitoring point MEPd2 (ring port Pr[2]) illustrated in FIG. 4. Therefore, by monitoring the internal continuity based on the ICCM frames ICC12 and ICC21, the presence or absence of fault in the relay path 20 illustrated in FIG. 4 can be determined.

In addition, the first internal monitoring point IMEP1 transmits an ICCM frame ICC1*n* at regular intervals to the internal monitoring point IMEPn, and the internal monitoring point IMEPn also transmits an ICCM frame ICCn1 at regular intervals to the first internal monitoring point IMEP1. In the same way, though not illustrated, the first internal monitoring point IMEP1 performs transmission and reception of the ICCM frame at regular intervals also with the other line cards (LC[3] to LC[n−1]). Furthermore, here, the case where the fabric path unit 26 is a fabric card is taken as an example, and the first internal monitoring point IMEP1 transmits an ICCM frame ICC11 at regular intervals to itself via a loop-back path in the fabric path unit 26.

Though not illustrated, the line card LC[2] transmits the ICCM frame at regular intervals to the other line cards (LC[3] to LC[n]) and itself in the same way in addition to the line card LC[1]. The line card LC[n] also transmits the ICCM frame at regular intervals to the other line cards (LC[2] to LC[n−1]) and itself in addition to the line card LC[1].

In the example of FIG. 12, a fault has occurred in a communication path of the ICCM frame ICC12 on the fabric path unit 26. In this case, since the second internal monitoring point IMEP2 does not receive the ICCM frame ICC12 within a predetermined period, it recognizes that the internal continuity with respect to the first internal monitoring point IMEP1 of the line card LC[1] is a LOC state. Thus, the second internal monitoring point IMEP2 transmits the ICCM frame ICC21 containing the information indicative of the no reception to the first internal monitoring point IMEP1. In the present embodiment, the ICCM frame containing the information indicative of the no reception is referred to as an internal RDI frame.

The first internal monitoring point IMEP1 receives the ICCM frame (internal RDI frame) ICC21, and recognizes that the internal continuity with respect to the second internal monitoring point IMEP2 of the line card LC[2] is a RDI state. As a result, in this case, the ERP control unit (ring control unit described in FIG. 4) 38 controls the first monitoring point MEP1 in accordance with the determination result (recognition of the RDI state) of the absence of internal continuity with respect to the second internal monitoring point IMEP2 in the first internal monitoring point IMEP1. Specifically, the ERP control unit 38 instructs the first monitoring point MEP1 to transmit the RDI frame or instructs it to stop the transmission of the CCM frame as described in FIG. 4.

In the same way, the ERP control unit (ring control unit) 38 of the line card LC[2] controls the second monitoring point MEP2 in accordance with the determination result (recognition of the LOC state) of the absence of internal continuity with respect to the first internal monitoring point IMEP1 in the second internal monitoring point IMEP2. Specifically, the ERP control unit 38 instructs the second monitoring point MEP2 to transmit the RDI frame or instructs it to stop the transmission of the CCM frame. Note that, although the function of the ring control unit described in FIG. 4 is provided in the ERP control unit 38 in this case, it is not particularly limited to this, and it may be provided in the frame processing unit 31 or the like.

<<Ring Protocol Operation of Relay Device (Present Embodiment)>>

Figure 13:
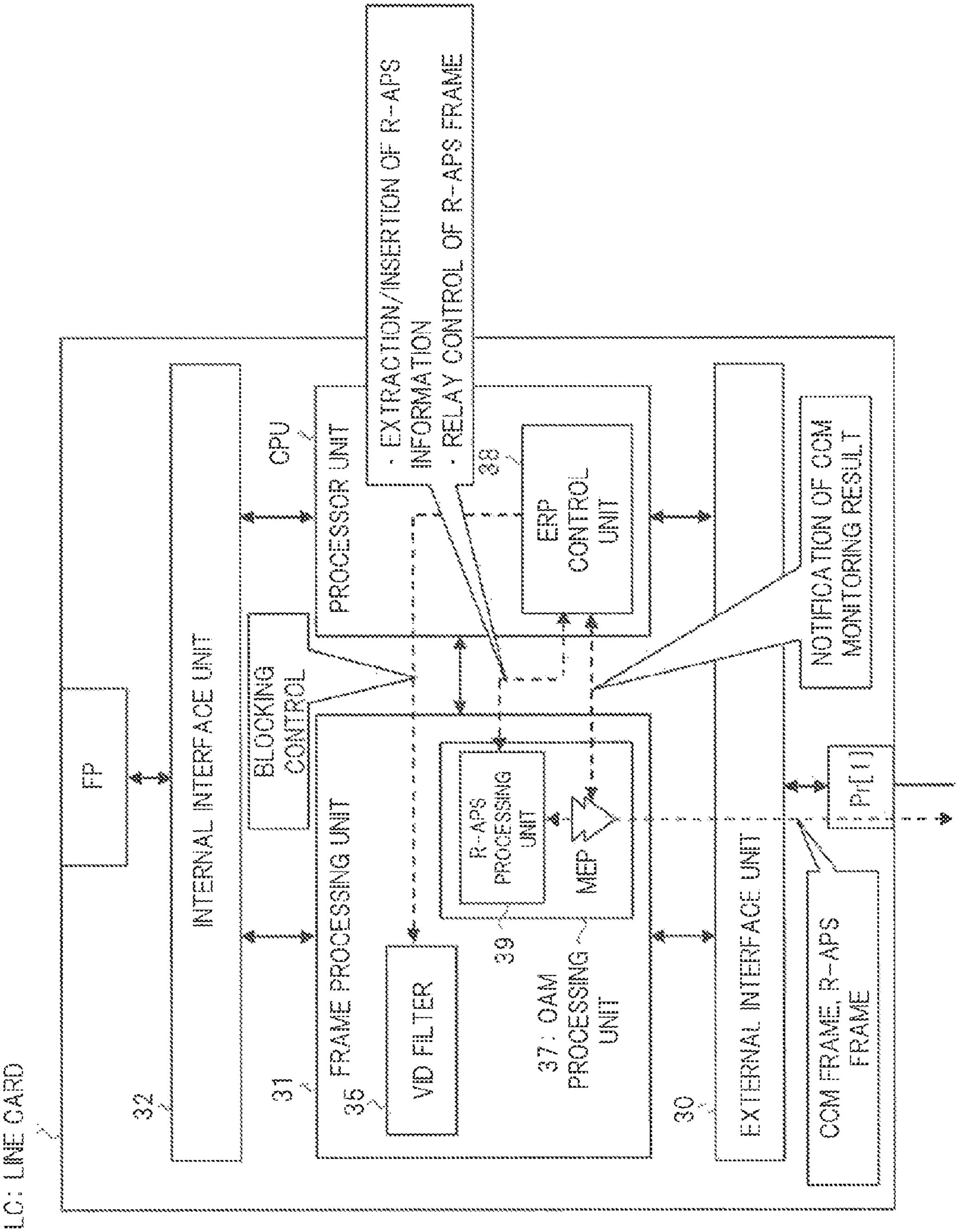
FIG. 13 is an explanatory diagram schematically illustrating an operation example around the ERP control unit in the relay device of FIGS. 9 and 10.

FIG. 13 is an explanatory diagram schematically illustrating an operation example around the ERP control unit in the relay device of FIGS. 9 and 10. In FIG. 13, the monitoring point MEP in the OAM processing unit 37 generates a CCM frame at regular intervals, and transmits the CCM frame from the ring port (Pr[1] in this example) via the external interface unit 30. In addition, the monitoring point MEP discriminates the CCM frame from among the frames which have been received at the ring port (Pr[1]) and transmitted via the external interface unit 30. The CCM frame is discriminated by, for example, the destination MAC address of the frame and various identifiers in the frame.

The monitoring point MEP determines the presence or absence of continuity of the link connected to the ring port (Pr[1]) by performing the transmission and reception of the CCM frame at regular intervals. The determination result of the presence or absence of continuity (that is, presence or absence of recognition of the LOC state or the RDI state) is notified to the ERP control unit 38. For example, when the absence of continuity is notified, the ERP control unit 38 controls the ring port (Pr[1]) to the block state BK as illustrated in FIG. 5 by performing a predetermined setting in the VID filter 35.

The R-APS processing unit 39 performs transmission, reception and relaying of the R-APS frame. The R-APS processing unit 39 is made up of, for example, MIP (Maintenance Intermediate Point) whose MEG (Maintenance Entity Group) level is higher than that of the monitoring point MEP. When the R-APS processing unit 39 transmits the R-APS frame, the ERP control unit 38 generates predetermined control information (R-APS information) inserted into the R-APS frame, and instructs the R-APS processing unit 39 to transmit the R-APS frame containing the R-APS information. The R-APS information means a variety of information specified by ITU-T G.8032 typified by SF, NR, RB and others as illustrated in FIGS. 5 and 8.

The R-APS frame transmitted by the R-APS processing unit 39 is transmitted from the ring port (Pr[1]) via the monitoring point MEP.

In addition, when the R-APS processing unit 39 has received the R-APS frame via the ring port (Pr[1]) and the monitoring point MEP, it extracts the R-APS information contained in the R-APS frame, and notifies the R-APS information to the ERP control unit 38. The ERP control unit 38 performs a predetermined control operation in accordance with the R-APS information. The predetermined control operation means various control operations specified by ITU-T G.8032 typified by control of the block state BK to the ring port (Pr[1]), issuance of a flush instruction to the address table FDB, and relay control of the R-APS frame as illustrated in FIGS. 5 and 8.

As mentioned above, by using the relay system and relay device of the present first embodiment, typically, an appropriate path switching in accordance with the internal fault of the relay device can be realized. This effect becomes advantageous particularly when the ring protocol specified by ITU-T G.8032 is used. Note that, although the case where the chassis type switching device (relay device) is used has been taken as an example here, a box type switching device may be used. The box type switching device has an overall configuration obtained by, for example, deleting the internal interface unit 32 and others from the configuration illustrated in FIG. 10.

However, when a box type switching device is used, for example, a candidate of a specific fault location of the relay path 20 between ring ports illustrated in FIG. 4 will be the frame processing unit 31 of FIG. 10. This case results in a state where a transmitting operation of each monitoring point stops, and the fault detection is likely to be performed by the switching devices SWc and SWe of FIG. 4. On the other hand, when the chassis type switching device is used, since there are many candidates of specific fault locations of the relay path 20 between ring ports, a situation where a monitoring point operates normally irrespective of the fault is likely to arise. Therefore, in this viewpoint, a more advantageous effect is acquired when the chassis type switching device is used.

Second Embodiment

Configuration of Relay Device (Applied Example)

Figure 14:
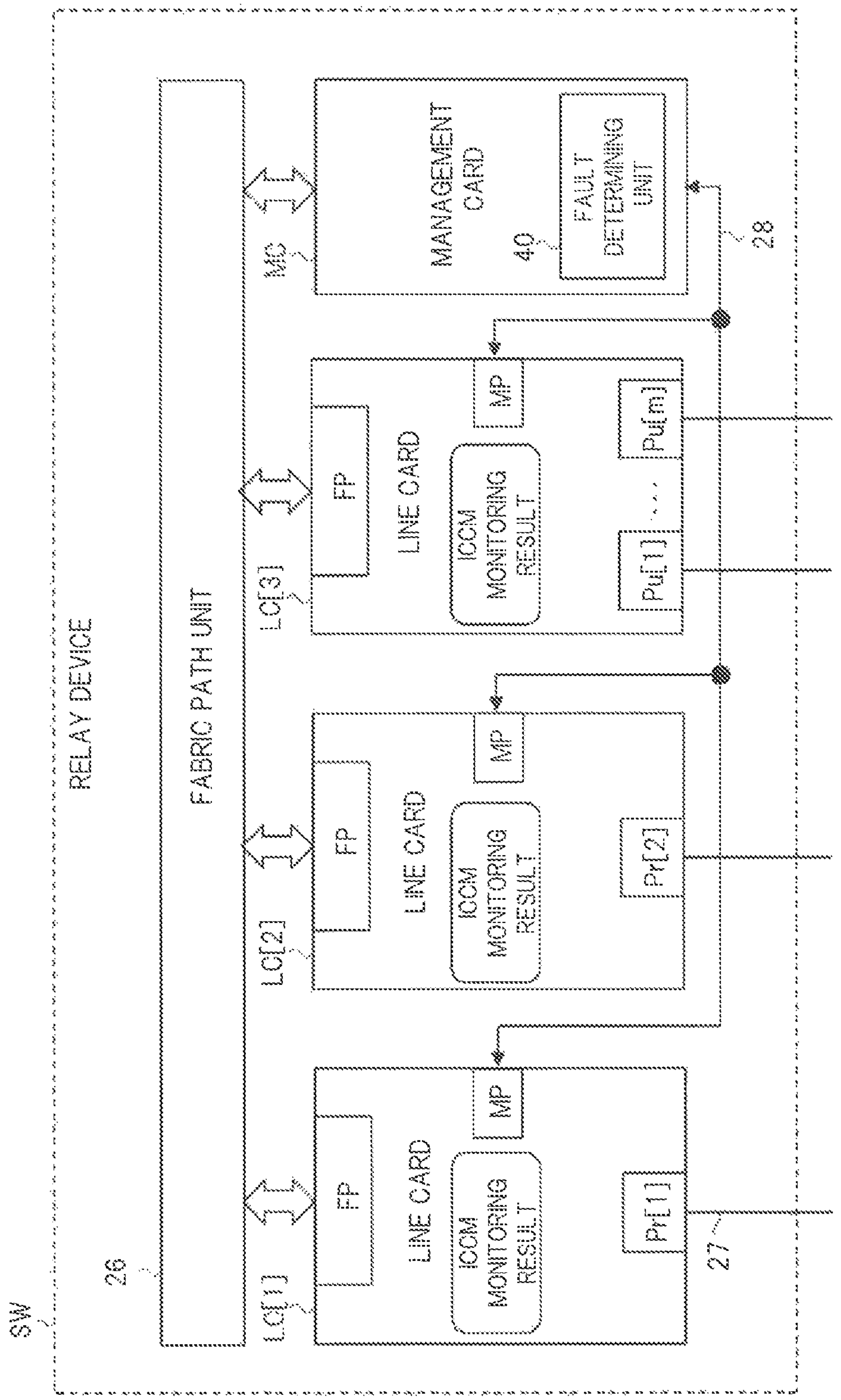
FIG. 14 is a schematic diagram illustrating a configuration example in a relay device according to the second embodiment of the present invention.

FIG. 14 is a schematic diagram illustrating a configuration example in a relay device according to the second embodiment of the present invention. As compared with the configuration example illustrated in FIG. 9, the switching device (relay device) SW illustrated in FIG. 14 differs in that the management card MC is provided with a fault determining unit 40 and two ring ports Pr[1] and Pr[2] are limited to be provided on different line cards, respectively. In the example of FIG. 14, the line card (first line card) LC[1] is provided with the ring port (first port) Pr[1], and the line card (second line card) LC[2] is provided with the ring port (second port) Pr[2]. In addition, the case where the number of line cards is three is taken as an example here for convenience. Although not particularly limited, the line card LC[3] is provided with the user ports Pu[1] to Pu[m].

<<Operation of Fault Determining Unit>>

Figure 15:
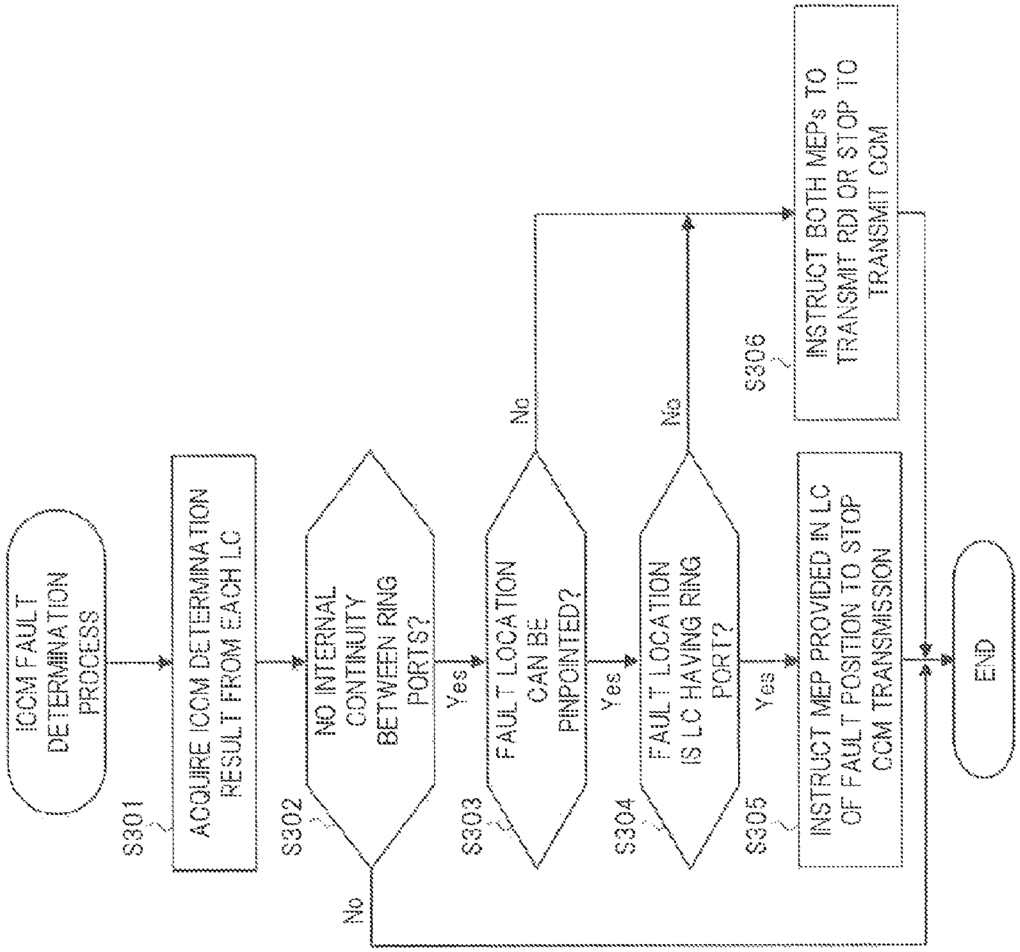
FIG. 15 is a flow chart illustrating an operation example of the fault determining unit in the relay device of FIG. 14.

FIG. 15 is a flow chart illustrating an operation example of the fault determining unit in the relay device of FIG. 14. First, as a premise, each of the plurality of line cards LC[1] to LC[3] illustrated in FIG. 14 determines the presence or absence of internal continuity by transmitting and receiving the internal continuity monitoring frame (ICCM frame) via the fabric path unit 26 between itself and each of the other line cards as described in FIG. 12.

Under this premise, as illustrated in FIG. 15, the fault determining unit 40 first acquires a determination result of the presence or absence of internal continuity via the management communication line 28 from each of the plurality of line cards LC [1] to LC[3](Step S301). Subsequently, the fault determining unit 40 determines the presence or absence of internal continuity between the ring ports based on the determination result of the presence or absence of internal continuity acquired from each line card (Step S302). In the example of FIG. 14, the fault determining unit 40 determines the presence or absence of internal continuity between the line card LC[1] and the line card LC[2] based on the determination result of the presence or absence of internal continuity acquired from the line cards LC[1] and LC[2].

Here, in the case of no internal continuity between the ring ports, the fault determining unit 40 determines whether the fault location can be pinpointed based on the determination result of the presence or absence of internal continuity acquired from each line card (Step S303). FIG. 16 is an explanatory diagram illustrating an example of a method of pinpointing a fault location in the flow of FIG. 15. The fault determining unit 40 is provided with a fault determination table 41 in which determination results of the presence or absence of internal continuity acquired from each line card are summarized as illustrated in FIG. 16.

When the operation of FIG. 12 is performed, the fault determining unit 40 acquires, from the line card LC[1], the determination result of the presence or absence of internal continuity with respect to its own line card (LC[1]) and the determination result of the presence or absence of internal continuity with respect to each of the other line cards LC[2] and LC[3]. The fault determining unit 40 can generate the fault determination table 41 as illustrated in FIG. 16 by acquiring the similar information also from each of the line cards LC [2] and LC [3].

In the example of the fault determination table 41 of FIG. 16, it is determined that the internal continuity is absent between the line card LC[1] and each of the line cards LC[2] and LC[3]. On the other hand, it is determined that the internal continuity is present between the line card LC[2] and the line card LC[3]. As a result, the fault determining unit 40 can pinpoint a fault location on the line card LC[1]. Furthermore, since the internal continuity is absent also between the line card LC[1] and the line card LC[1] in this case, the fault determining unit 40 can pinpoint the fault location on the line card LC[1] with a higher reliability.

In FIG. 15, when a fault location cannot be pinpointed in Step S303, the fault determining unit 40 instructs the monitoring points MEPd1 and MEPd2 of both of the ring ports Pr [1] and Pr [2] to transmit the RDI frame or to stop the transmission of the CCM frame as illustrated in FIG. 4 (Step S306). Specifically, the fault determining unit 40 gives such instructions via the ERP control units (ring control units) 38 of the line cards LC[1] and LC[2].

Note that the case where a fault location cannot be pinpointed includes, for example, a case where the internal continuity is absent also between the line card LC[2] and the line card LC[3] and a case where the internal continuity is present between the line card LC[1] and the line card LC[1] in the fault determination table 41 of FIG. 16. However, a method of pinpointing a fault location is not particularly limited to such examples, and various methods can be used.

When the fault location can be pinpointed in Step S303, the fault determining unit 40 determines whether the fault location is a line card having a ring port (namely, one of the first and second line cards LC[1] and LC[2]) (Step S304). When the fault location can be pinpointed to only one of the line cards LC[1] and LC[2], the fault determining unit 40 instructs only the monitoring point provided in the one line card to stop the transmission of the CCM frame (Step S305).

For example, in the example of the fault determination table 41 of FIG. 16, the fault determining unit 40 instructs only the monitoring point provided in the line card LC[1] to stop the transmission of the CCM frame, and does not instruct anything to the monitoring point provided in the line card LC[2]. The instruction to stop the transmission of the CCM frame may be given by, for example, performing the link-down for the corresponding ring port. In addition, the fault determining unit 40 executes the process of Step S306 when the fault location is not a line card having a ring port in Step S304.

Figure 17:
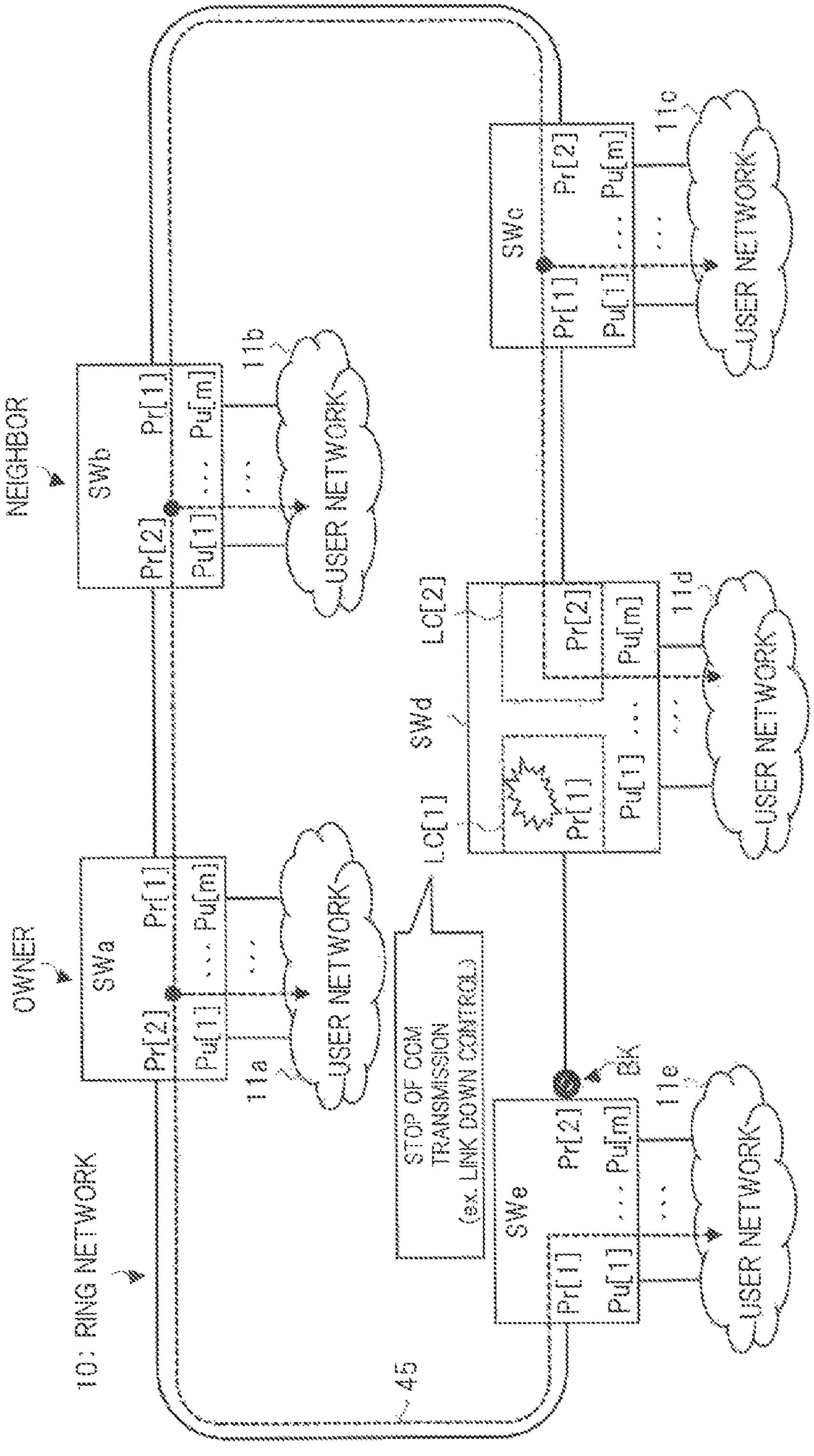
FIG. 17 is a diagram illustrating a frame transfer path in the case where a fault location is pinpointed in one line card having a ring port in FIG. 15 and the path switching of the ring network in accordance with this is performed.

Here, when the process of Step S305 in FIG. 15 is executed, the state illustrated in FIG. 17 is obtained. FIG. 17 is a diagram illustrating a frame transfer path in the case where a fault location is pinpointed in one line card having a ring port in FIG. 15 and the path switching of the ring network in accordance with this is then performed. In FIG. 17, although the ring port Pr[2] of the switching device SWe is controlled to the block state BK, the ring port Pr[1] of the switching device SWc is in an open state unlike the case of FIG. 6 mentioned above.

More specifically, in the switching device SWd, although the CCM frame is not transmitted from the ring port Pr[1] of the line card LC[1] having a fault, the CCM frame is transmitted from the ring port Pr[2] of the line card LC[2] having no fault. As a result, a communication path 45 via the switching devices SWa, SWb and SWc is formed between the switching device SWe and the switching device SWd. The frame transfer between the user networks 11*a* to 11*e* is performed on this communication path 45.

As a result, it becomes possible to maintain the communication path between the user network 11*d* and the ring network 10 unlike the case of FIG. 6. For example, in FIG. 14, when only the line card LC[1] has a fault and the internal continuity is present between the line card LC[2] and the line card LC[3], communication of user frame can be performed between the ring port Pr[2] and the user ports Pu[1] to Pu[m] of the line card LC[3].

Note that, although the fault determining unit 40 does not instruct anything to the monitoring point provided in the line card LC[2] in Step S305 in the description above, an instruction to transmit the R-APS (SF) frame may be given to the monitoring point as a modification example thereof. Since the frame transfer path illustrated in FIG. 17 is established also by this means, the same effect can be obtained.

In the foregoing, the invention made by the inventor of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, although the case where a neighbor node is set in a ring network is taken as an example in the description above, the method of the present embodiment can be similarly applied also to the case where a neighbor node is not set and only an owner node is set. In addition, although the fault determining unit 40 is provided in the management card MC in FIG. 14, the fault determining unit 40 is not limited to this, and the fault determining unit 40 may be provided in any part of a switching device SW. Furthermore, the ERP control unit 38 does not necessarily need to be configured by the processor unit CPU, and may be configured by dedicated hardware depending on the case.

What is claimed is:

1. A relay system including a plurality of relay devices constituting a ring network, each of the plurality of relay devices comprising:

a first port and a second port which are connected to the ring network;

a first monitoring point which monitors continuity between the first port of its own device and the second port of another device connected to the first port by use of a CCM frame based on Ethernet OAM; and a second monitoring point which monitors continuity between the second port of its own device and the first port of another device connected to the second port by use of the CCM frame, at least one of the plurality of relay devices further comprising:

a first internal monitoring point and a second internal monitoring point which are provided so as to correspond to the first monitoring point and the second monitoring point, respectively, and monitor continuity inside a device between the first monitoring point and the second monitoring point by transmitting and receiving an internal continuity monitoring frame at regular intervals; and a ring control unit which, when the internal continuity monitoring frame is not received within a predetermined period by the first internal monitoring point or the second internal monitoring point, instructs the first monitoring point and the second monitoring point to transmit a RDI frame based on Ethernet OAM or instructs them to stop transmission of the CCM frame.

2. The relay system according to claim 1, wherein the ring network is controlled based on a ring protocol specified by ITU-T G.8032.

3. The relay system according to claim 2, wherein at least one of the plurality of relay devices includes:

a plurality of line cards which transmit and receive a frame between themselves and outside of the device; and a fabric path unit which relays a frame between the plurality of line cards, the first monitoring point and the first internal monitoring point are provided in a line card having the first port, the second monitoring point and the second internal monitoring point are provided in a line card having the second port, the first internal monitoring point transmits the internal continuity monitoring frame to the second internal monitoring point at regular intervals, the second internal monitoring point transmits the internal continuity monitoring frame to the first internal monitoring point at regular intervals, and when one of the first internal monitoring point and the second internal monitoring point does not receive the internal continuity monitoring frame within a predetermined period, it transmits the internal continuity monitoring frame containing information indicative of the no reception to the other.

4. The relay system according to claim 3, wherein the first port, the first monitoring point and the first internal monitoring point are provided on a first line card, the second port, the second monitoring point and the second internal monitoring point are provided on a second line card different from the first line card, the first internal monitoring point transmits the internal continuity monitoring frame via the fabric path unit to the second internal monitoring point at regular intervals, and the second internal monitoring point transmits the internal continuity monitoring frame via the fabric path unit to the first internal monitoring point at regular intervals.

5. The relay system according to claim 4, wherein at least one of the plurality of relay devices further includes a fault determining unit, each of the plurality of line cards determines presence or absence of continuity inside the device by transmitting and receiving the internal continuity monitoring frame between itself and each of the other line cards via the fabric path unit, and when a fault location can be pinpointed to only one of the first line card and the second line card based on a determination result of presence or absence of continuity inside the device in each of the plurality of line cards, the fault determining unit instructs only a monitoring point provided in the one line card to stop transmission of the CCM frame, and when the fault location cannot be pinpointed, the fault determining unit instructs monitoring points provided in both of the line cards to transmit the RDI frame or instructs them to stop the transmission of the CCM frame via the ring control unit.

6. A relay device constituting a ring network, comprising:

a first port and a second port which are connected to the ring network;

a first monitoring point which monitors continuity between the first port and a second port of another device connected to the first port by use of a CCM frame based on Ethernet OAM;

a second monitoring point which monitors continuity between the second port and a first port of another device connected to the second port by use of the CCM frame;

a first internal monitoring point and a second internal monitoring point which are provided so as to correspond to the first monitoring point and the second monitoring point, respectively, and monitor continuity inside a device between the first monitoring point and the second monitoring point by transmitting and receiving an internal continuity monitoring frame at regular intervals; and a ring control unit which, when the internal continuity monitoring frame is not received within a predetermined period by the first internal monitoring point or the second internal monitoring point, instructs the first monitoring point and the second monitoring point to transmit a RDI frame based on Ethernet OAM or instructs them to stop transmission of the CCM frame.

7. The relay device according to claim 6, wherein the ring network is controlled based on a ring protocol specified by ITU-T G.8032.

8. The relay device according to claim 7, further comprising:

a plurality of line cards which transmit and receive a frame between themselves and outside of the device; and a fabric path unit which relays a frame between the plurality of line cards, wherein the first monitoring point and the first internal monitoring point are provided in a line card having the first port, the second monitoring point and the second internal monitoring point are provided in a line card having the second port, the first internal monitoring point transmits the internal continuity monitoring frame to the second internal monitoring point at regular intervals, the second internal monitoring point transmits the internal continuity monitoring frame to the first internal monitoring point at regular intervals, and when one of the first internal monitoring point and the second internal monitoring point does not receive the internal continuity monitoring frame within a predetermined period, it transmits the internal continuity monitoring frame containing information indicative of the no reception to the other.

9. The relay device according to claim 8, wherein the first port, the first monitoring point and the first internal monitoring point are provided on a first line card, the second port, the second monitoring point and the second internal monitoring point are provided on a second line card different from the first line card, the first internal monitoring point transmits the internal continuity monitoring frame via the fabric path unit to the second internal monitoring point at regular intervals, and the second internal monitoring point transmits the internal continuity monitoring frame via the fabric path unit to the first internal monitoring point at regular intervals.

10. The relay device according to claim 9, further comprising a fault determining unit, each of the plurality of line cards determines presence or absence of continuity inside the device by transmitting and receiving the internal continuity monitoring frame between itself and each of the other line cards via the fabric path unit, and when a fault location can be pinpointed to only one of the first line card and the second line card based on a determination result of presence or absence of continuity inside the device in each of the plurality of line cards, the fault determining unit instructs only a monitoring point provided in the one line card to stop transmission of the CCM frame, and when the fault location cannot be pinpointed, the fault determining unit instructs monitoring points provided in both of the line cards to transmit the RDI frame or instructs them to stop the transmission of the CCM frame via the ring control unit.

* * * * *